United States Patent [19]

Katagiri et al.

[11] 4,418,133
[45] Nov. 29, 1983

[54] DISAZO PHOTOCONDUCTIVE MATERIAL AND ELECTROPHOTOGRAPHIC PHOTOSENSITIVE MEMBER HAVING DISAZO PIGMENT LAYER

[75] Inventors: Kazuharu Katagiri, Mitaka; Shoji Umehara, Fuchu; Katsunori Watanabe, Yamato; Shozo Ishikawa, Sayama, all of Japan

[73] Assignee: Canon Kabushiki Kaisha, Tokyo, Japan

[21] Appl. No.: 354,899

[22] Filed: Mar. 4, 1982

[30] Foreign Application Priority Data

Mar. 27, 1981 [JP] Japan .................................. 56-44066
Jul. 17, 1981 [JP] Japan ................................ 56-112658
Jul. 17, 1981 [JP] Japan ................................ 56-112659

[51] Int. Cl.³ ............................................. G03G 5/06
[52] U.S. Cl. ...................................... 430/58; 430/77; 260/158
[58] Field of Search ........................ 430/58, 59, 76, 77, 430/78; 260/157, 158

[56] References Cited

U.S. PATENT DOCUMENTS

| | | |
|---|---|---|
| 3,180,729 | 4/1965 | Klupfel et al. |
| 3,378,554 | 4/1968 | Pushchel et al. |
| 3,484,237 | 12/1969 | Shattuck et al. |
| 3,684,502 | 8/1972 | Gramza et al. |
| 3,775,105 | 11/1973 | Kukla |
| 3,775,108 | 11/1973 | Arai |
| 3,824,099 | 7/1974 | Champ et al. |
| 3,837,851 | 9/1974 | Shattuck et al. |
| 3,844,691 | 5/1975 | Rochlitz |
| 3,870,516 | 3/1975 | Smith et al. |
| 3,871,882 | 3/1975 | Wiedemann |
| 3,877,935 | 4/1975 | Regensburger et al. |
| 3,894,868 | 7/1975 | Regensburger et al. |
| 4,024,125 | 5/1977 | Kunstmann et al. |
| 4,122,113 | 10/1978 | Purner |
| 4,150,987 | 4/1979 | Anderson et al. |
| 4,251,614 | 2/1981 | Sasaki et al. |
| 4,256,821 | 3/1981 | Enomoto et al. |
| 4,260,672 | 4/1981 | Sasaki |
| 4,265,991 | 5/1981 | Hirai et al. |
| 4,272,598 | 6/1981 | Sasaki et al. |
| 4,278,747 | 7/1981 | Murayama et al. |
| 4,279,981 | 7/1981 | Ohta et al. |
| 4,297,426 | 10/1981 | Sakai et al. |

FOREIGN PATENT DOCUMENTS

| | | |
|---|---|---|
| 13172 | 7/1980 | European Pat. Off. |
| 2302522 | 8/1974 | Fed. Rep. of Germany |
| 2844394 | 7/1979 | Fed. Rep. of Germany |
| 43-16197 | 7/1968 | Japan |
| 51-94829 | 8/1976 | Japan |
| 48-71236 | 9/1973 | Japan |
| 54-112637 | 9/1979 | Japan |
| 54-119925 | 9/1979 | Japan |
| 54-121742 | 9/1979 | Japan |
| 55-52064 | 1/1980 | Japan |
| 55-17105 | 2/1980 | Japan |
| 55-157551 | 2/1980 | Japan |
| 55-108667 | 8/1980 | Japan |
| 930988 | 7/1963 | United Kingdom |
| 1030024 | 5/1966 | United Kingdom |
| 1296390 | 11/1972 | United Kingdom |
| 1370197 | 10/1976 | United Kingdom |
| 1453024 | 10/1976 | United Kingdom |
| 1465141 | 2/1977 | United Kingdom |
| 1465142 | 2/1977 | United Kingdom |
| 1490197 | 10/1977 | United Kingdom |
| 2001769A | 2/1979 | United Kingdom |
| 2018446A | 10/1979 | United Kingdom |
| 2034493A | 6/1980 | United Kingdom |
| 2052082A | 1/1981 | United Kingdom |
| 2055803A | 3/1981 | United Kingdom |
| 2034494A | 6/1982 | United Kingdom |

*Primary Examiner*—John E. Kittle
*Assistant Examiner*—John L. Goodrow
*Attorney, Agent, or Firm*—Fitzpatrick, Cella, Harper & Scinto

[57] ABSTRACT

An organic photoconductive material represented by the formula

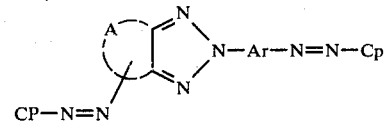

wherein A is an atomic group necessary for completing a substituted or unsubstituted aromatic hydrocarbon ring, Ar is a substituted or unsubstituted group, and Cp is a coupler residue.

26 Claims, No Drawings

DISAZO PHOTOCONDUCTIVE MATERIAL AND ELECTROPHOTOGRAPHIC PHOTOSENSITIVE MEMBER HAVING DISAZO PIGMENT LAYER

BACKGROUND OF THE INVENTION

1. Field of the Invention

The present invention relates to electrophotographic photosensitive members and more particularly to an electrophotographic photosensitive member containing a specific azo pigment.

2. Description of the Prior Art

As photosensitive members having layers containing organic pigments on a conductive layer known in the art, there are:

(i) a photosensitive member having a layer containing organic pigments dispersed in an insulating binder provided on a conductive layer, as disclosed in Japanese Patent Publication No. 1667/1977 (Electrophotographic plate);

(ii) a photosensitive member having a layer containing organic pigments dispersed in a charge transport medium, comprising a charge transport material or a combination of said material with an insulating binder (binder itself may be a charge transport material), provided on a conductive layer, as disclosed in U.S. Pat. No. 3,894,868 (Electrophotographic plate) and U.S. Pat. No. 3,870,516 (Electrophotographic imaging method);

(iii) a photosensitive member, comprising a conductive layer, charge generation layer containing organic pigments and a charge transport layer, as disclosed in U.S. Pat. No. 3,837,851 (Electrophotographic plate);

(iv) a photosensitive member, comprising organic pigments added in a charge-transfer complex, as disclosed in U.S. Pat. No. 3,775,105 (Photoconductive member); and (v) other types of members.

While a wide variety of pigments, including phthalocyanine pigments, polycyclic quinone pigments, azo pigments, and quinacridone pigments, have been proposed for use in these photosensitive members, few of them have been actually used.

The reason is that organic photoconductive pigments are generally inferior in sensitivity and durability to inorganic ones such as Se, CdS, and ZnO.

Meanwhile, inorganic photosensitive materials have the following drawbacks:

In selenium base photosensitive members, the crystallization of photosensitive material is readily promoted by heat, moisture, dust, fingerprints, or other factors, remarkably in particular when the atmospheric temperature exceeds about 40° C., resulting in deterioration of the charge bearing characteristics and appearance of white spots in the images. Although the life span of selenium base photosensitive members is said to be as long as about 30–50 thousand copies (in terms of copying capacity per life), the present situation is that many of these elements cannot attain in practice such a life span because the environmental conditions are diversified depending upon the territory and position where the copying machine is set.

Cadmium sulfide base photosensitive members, though having about the same life span as selenium base members, have poor moisture resistance, due to cadmium sulfide itself, which is difficult to overcome, and therefore require some auxiliary means, for example, such as a heater, in order to prevent the moisture absorption.

Zinc oxide base photosensitive members, because they contain a sensitizing dye typified by Rose Bengal, involve the problems of charge deterioration and light fading of the dye, and the life span thereof is at present only about 1000 copies.

Sensitivities of conventional photosensitive members, expressed in exposure quantity for halving original potential, $E \frac{1}{2}$, are in the order of 15 lux.sec for those of unsensitized Se type, 4–8 lux.sec for those of sensitized Se type and of CdS type, and 7–12 lux.sec for those of ZnO type.

Desirable sensitivity of practical photosensitive members are of $E \frac{1}{2}$ value up to 20 lux.sec in the case of ordinary plane paper copying machines and up to 15 lux.sec in the case of high-speed copying machine, though members of lower sensitivity may be used in certain applications.

On the other hand, various kinds of organic photoconductive polymers including poly(vinylcarbazole) in the first place and low-molecular organic photoconductive substances such as 2,5-bis(p-diethylaminophenyl)-1,3,4-oxadiazole have been proposed. It is difficult to use actually these materials, in spite of their superiority in lightness to the above-said inorganic photoconductive materials. The reason for the unsuccessfulness is that these organic photoconductive substances are inferior to inorganic ones in sensitivity, durability, and stability to the change of surrounding conditions.

SUMMARY OF THE INVENTION

An object of this invention is to provide a novel electrophotographic photosensitive member overcoming the drawbacks of conventional inorganic ones and improving those of organic ones even proposed.

Another object of the invention is to provide an excellent electrophotographic photosensitive members having high sensitivity and durability satisfactory for actual use, and additionally solving the problems, occurring in the case of inorganic photosensitive members, of low heat resistance (due to the crystallization of Se), low moisture resistance, light fading, and the like.

A further object of the invention is to provide azo pigments, suitable for organic electrophotographic photosensitive members.

A still further object of the invention is to provide azo pigments, particularly disazo pigment, adaptable for the charge generating material used in electrophotographic photosensitive members having charge generation and charge transport layers.

Other objects of the invention will be readily apparent from the following detailed description.

According to one aspect of the present invention, there is provided an organic photoconductive material represented by the formula

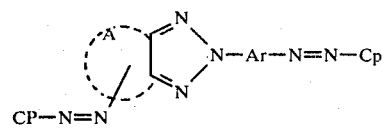

wherein A is an atomic group necessary for completing a substituted or unsubstituted aromatic hydrocarbon ring; Ar is a substituted or unsubstituted arylene group; and Cp is a coupler residue.

According to another aspect of the present invention, there is provided an electrophotographic photosensitive member characterized by having a layer which contains a disazo pigment represented by the formula

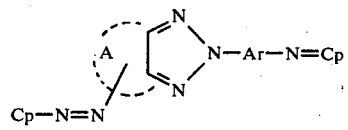

wherein A is an atomic group necessary for completing a substituted or unsubstituted aromatic hydrocarbon ring; Ar is a substituted or unsubstituted arylene group; and Cp is a coupler residue.

DETAILED DESCRIPTION OF THE INVENTION

The disazo pigments for use in the electrophotographic photosensitive member of this invention are represented by the following formula (I):

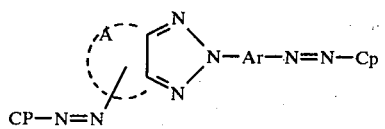

Herein, A represents an atomic group necessary for completing a substituted or unsubstituted aromatic hydrocarbon ring (e.g., benzene ring or naphthalene ring), Ar is a substituted or unsubstituted arylene group (its examples are given later), and Cp is a coupler residue (its examples are given later).

In preferred embodiments of this invention, suitable disazo pigments are represented by the following formula (1) or (2):

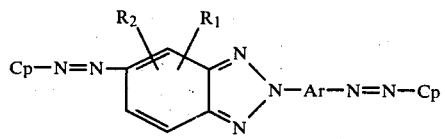

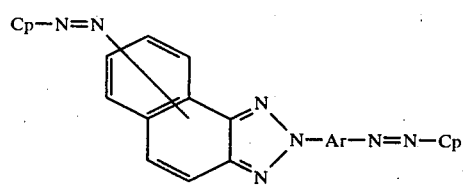

In formula (1), $R_1$ and $R_2$ represent hydrogen, halogen (e.g. chlorine or bromine), or organic monovalent group such as alkyl (e.g., methyl, ethyl, propyl, butyl, amyl, or octyl) or alkoxy (e.g., methoxy, ethoxy, propoxy, or butoxy).

The coupler residue represented by Cp in the above formulae is preferably the residue derived from a coupler selected from the group consisting of hydroxynaphthoic acid amide type couplers, hydroxynaphthalic acid imide type couplers, and aminonaphthol type couplers.

The coupler residues derived from hydroxy naphthoic acid amide type couplers can be represented by the following formula (3):

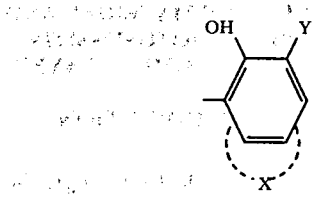

In this formula, X is an atomic group necessary for completing a substituted or unsubstituted aromatic hydrocarbon ring (e.g., benzene ring or naphthalene ring) or a substituted or unsubstituted heterocyclic ring (e.g. carbazole ring, benzofuran ring, or indole ring); and Y represents hydrogen,

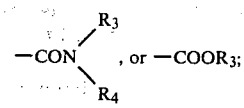

$R_3$ and $R_4$ represent hydrogen, substituted or unsubstituted alkyl, substituted or unsubstituted aryl, or substituted or unsubstituted aralkyl. Preferably $R_3$ and $R_4$ may be not hydrogens at the same time. For example, said alkyl represented by $R_3$ or $R_4$ include methyl, ethy, n-propyl, isopropyl, n-butyl, sec-butyl, t-butyl, n-amyl, sec-amyl, t-amyl, n-hexyl, n-octyl, 2-ethyl-hexyl, n-nonyl, n-octadecyl, 2-hydroxyethyl, 2-chloroethyl, 3-chloropropyl and the like; and said aryl represented by $R_3$ or $R_4$ includes phenyl, tolyl, xylyl, biphenyl, chlorophenyl, dichlorophenyl, trichlorophenyl, bromophenyl, dibromophenyl, tribromophenyl, methoxyphenyl, ethoxyphenyl, buthoxyphenyl, phenoxyphenyl, nitrophenyl, cyanophenyl, hydroxyphenyl, carboxyphenyl, N,N-dimethylaminophenyl, N,N-diethylaminophenyl, acetylphenyl, benzoylphenyl, methylthiophenyl, ethylthiophenyl, mercaptophenyl, α-naphthyl, β-naphthyl and the like; and said aralkyl represented by $R_3$ or $R_4$ includes benzyl, phenethyl, chlorobenzyl, dichlorobenzyl, dimethylbenzyl, methoxybenzyl, α-naphthylbenzyl, β-naphthylbenzyl and the like, and $R_4$ may be substituted or unsubstituted heterocyclic group (e.g. pyridyl carbazolyl) or substituted or unsubstituted aminos (e.g.N-methylamino, N-ethylamino, N,N-dimethylamino, N,N-diethylamino, N,N-diphenylamino, N-phenylamino).

The coupler residues derived from hydroxynaphthalic acid imide type couplers can be represented by the following formula (4) or (5):

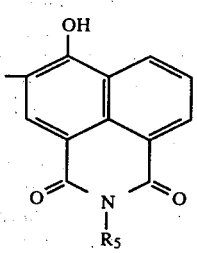

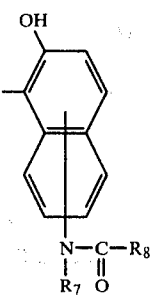

In formula (4) or (5), $R_5$ and $R_6$ represent substituted or unsubstituted alkyl, substituted or unsubstituted aralkyl, or substituted or unsubstituted aryl. For example, said alkyl represented by $R_5$ or $R_6$ includes methyl, ethyl, n-propyl, iso-propyl, n-butyl, t-butyl, hexyl, cyclohexyl, n-octyl, t-octyl, 2-ethylhexyl, methoxymethyl, ethoxymethyl, 2-methoxyphenyl, 2-ethoxyethyl, 2-hydroxyethyl, 2-carboxyethyl, 3-hydroxypropyl, 3-sulfopropyl, phenoxymethyl, 2-phenoxyethyl, 3-phenoxypropyl, 4-phenoxybutyl, 2-cyanomethyl, 3-cyanopropyl, acetylmethyl, 2-acetylethyl, 3-acetylpropyl, benzoylmethyl, 2-benzoylethyl, 3-benzoylpropyl, methoxymethoxymethyl, 2-methoxymethoxyethyl, 3-methoxymethoxypropyl, N,N-dimethyl-aminomethyl, 2-N,N-diethylaminoethyl, N,N-dibenzylaminomethyl, 2-N,N-dibenzylaminoethyl, 3-N,N-diethylaminopropyl, 3-N,N-diphenylaminopropyl, 3-mercaptopropyl, 4-mercaptobutyl, chloromethyl, 2-chloroethyl, 3-chloropropyl, 4-chlorobutyl, 2-bromoethyl, 4-bromobutyl, phenylthiomethyl, 2-phenylthioethyl, 3-phenylthiopropyl and the like; said aralkyl represented by $R_5$ or $R_6$ includes benzyl, methoxybenzyl, chlorobenzyl, dichlorobenzyl, cyanobenzyl, phenethyl, α-naphthylmethyl, β-naphthylmethyl, methylbenzyl, dimethylbenzyl, methoxybenzyl and the like; said aryl represented by $R_5$ or $R_6$ includes phenyl, tolyl, xylyl, biphenyl, chlorophenyl, dichlorophenyl, trichlorophenyl, bromophenyl, nitrophenyl, cyanophenyl, methoxyphenyl, ethoxyphenyl, ethylphenyl, diethylphenyl, propylphenyl, phenoxyphenyl, phenylthiophenyl, carboxyphenyl, hydroxyphenyl, sulfophenyl, N,N-dimethylaminophenyl, N,N-diethylaminophenyl, N,N-diphenylaminophenyl, N-ethyl-N-methylaminophenyl, acetylphenyl, benzoylphenyl, α-naphthyl, β-naphthyl and the like.

The coupler residue derived from aminonaphthol type couplers can be represented by the following formula (6) or (7):

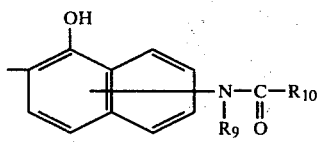

In formulas (6) and (7), $R_7$ and $R_9$ represent hydrogen, substituted or unsubstituted alkyl, substituted or unsubstituted aryl, or substituted or unsubstituted aralkyl. For example, said alkyl represented by $R_7$ or $R_9$ includes methyl, ethyl, n-propyl, isopropyl, n-buthyl, sec-butyl, t-butyl, n-amyl, sec-amyl, t-amyl, n-hexyl, n-octyl, 2-ethylhexyl, n-nonyl, n-octadecyl, 2-hydroxyethyl, 2-chloroethyl, 3-chloropropyl, 2-methoxyethyl, 3-methoxypropyl and the like; and said aryl represented by $R_7$ or $R_9$ includes phenyl, tolyl, xylyl, biphenyl, chlorophenyl, dichlorophenyl, trichlorophenyl, bromophenyl, dibromophenyl, tribromophenyl, methoxyphenyl, ethoxyphenyl, buthoxyphenyl, phenoxyphenyl, nitrophenyl, cyanophenyl, hydroxyphenyl, carboxyphenyl, dichloromethoxyphenyl, dimethoxyphenyl, α-naphthyl, β-naphthyl and the like; and said aralkyl represented by $R_7$ or $R_9$ includes benzyl, phenethyl, chlorobenzyl, dichlorobenzyl, dimethylbenzyl, methoxybenzyl, methylbenzyl, ethylbenzyl, α-naphthylbenzyl, β-naphthylbenzyl and the like. In formulas, $R_8$ and $R_{10}$ represented substituted or unsubstituted aryl, for example phenyl, α-naphthyl, β-naphthyl, tolyl, xylyl, methoxyphenyl, chlorophenyl, dichlorophenyl, trichlorophenyl, bromophenyl, ethylphenyl, dimethylaminophenyl, diethylaminophenyl, dibenzylaminophenyl, diphenylaminophenyl, and the like.

In formula (I), (1) or (2), Ar represents arylenes; for example the arylene selected from the phenylenes or naphthylenes represented by the following formulas:

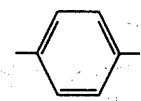

(1)

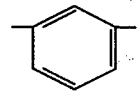

(2)

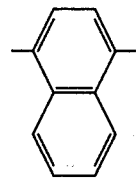

(3)

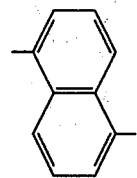

(4)

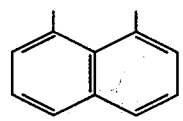

(5)

Their arylenes may be substituted by one or more atoms, or one or more groups, said atom includes halogen such as chlorine, bromine, and said group includes alkyls such as methyl, ethyl, n-propyl, isopropyl, n-butyl, sec-butyl, t-butyl, n-amyl, t-amyl, and the like; substituted alkyls such as hydroxymethyl, 2-hydroxyethyl, 3-hydroxypropyl, 4-hydroxybutyl, and the like; alkoxyalkyls such as methoxymethyl, 2-methoxyethyl, 3-methoxypropyl, 4-methoxybutyl, ethoxymethyl, 2-ethoxyethyl, 3-ethoxypropyl, 4-ethoxybutyl, 2-carboxyethyl, 3-carboxypropyl, 2-sulfoethyl and the like; alkoxys such as methoxy, ethoxy, butoxy, octoxy and the like; substituted or unsubstituted aryloxys such as phenoxy, chlorophenoxy, dichlorophenoxy, trichlorophenoxy, bromophenoxy, dibromophenoxy, methylphenoxy, ethylphenoxy and the like; substituted or unsubstituted arylthios such as phenylthio, tolylthio, xylylthio, chlorophenylthio, dichlorophenylthio, bromophenylthio, α-naphthylthio, β-naphthylthio, and the like; substituted or unsubstituted acyls such as acetyl, propyonyl, benzoyl, methylbenzoyl, and the like; substituted aminos such as N,N-dimethylamino, N,N-diethylamino, N,N-dipropylamino, N,N-diphenylamino, N,N-dibenzylamino, N-ethyl-N-phenylamino, and the like; cyano, nitro, hydroxy, sulfo and carboxyl.

Typical disazo pigments represented by formula (1) are recited as follows:

| Pigment No. | |
|---|---|
| (1) | 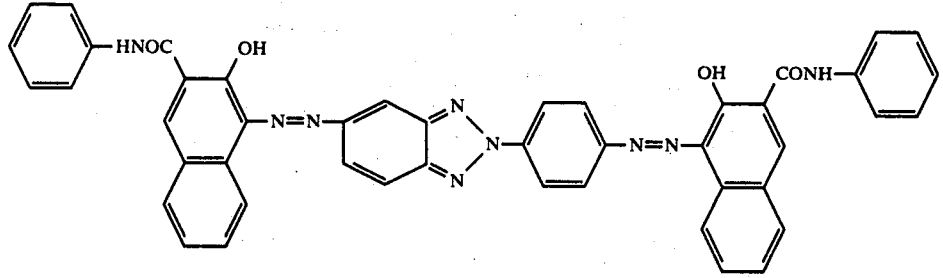 |
| (2) | 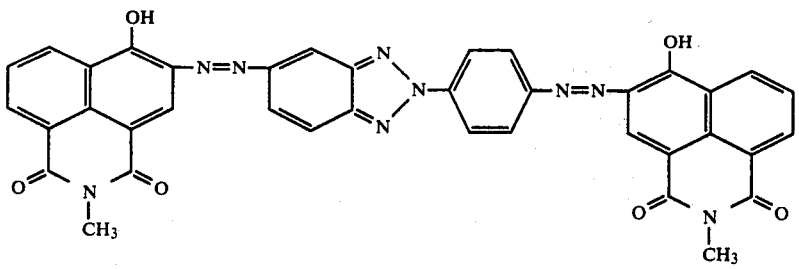 |
| (3) | 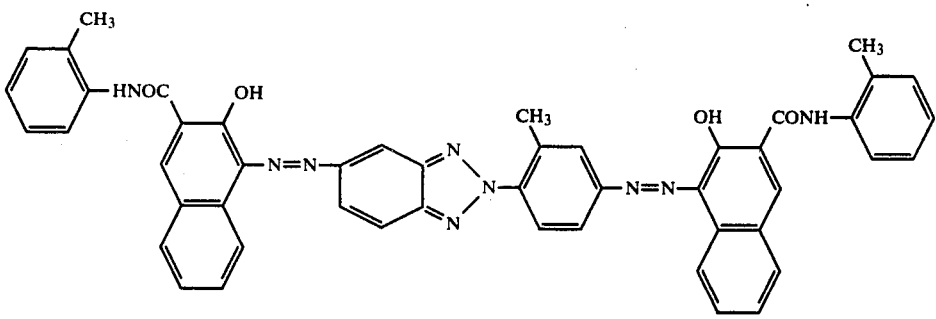 |
| (4) | 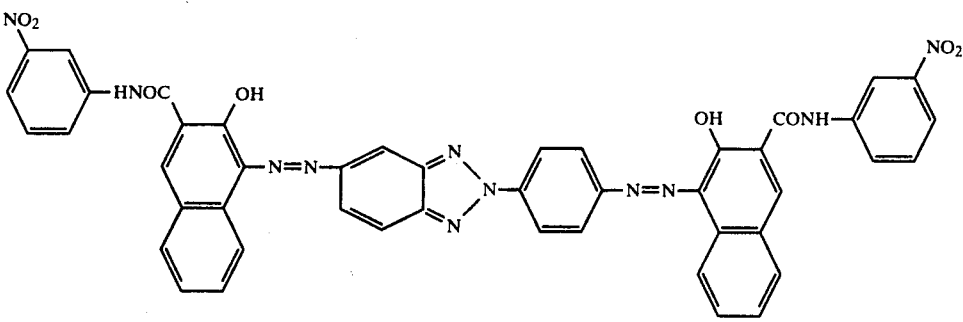 |

-continued
Pigment No.
(5) 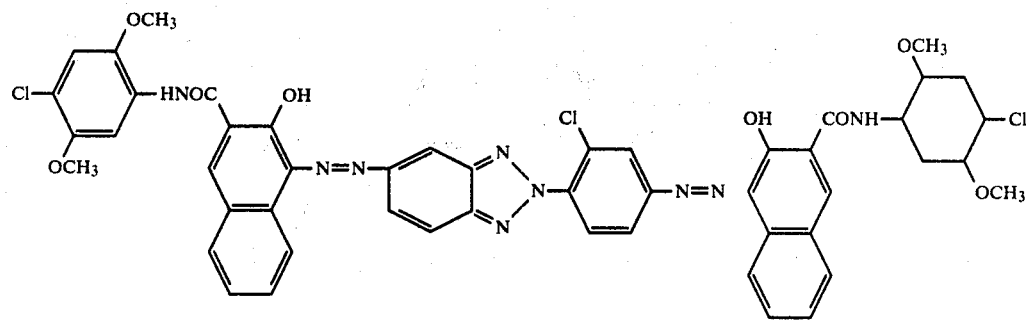
(6) 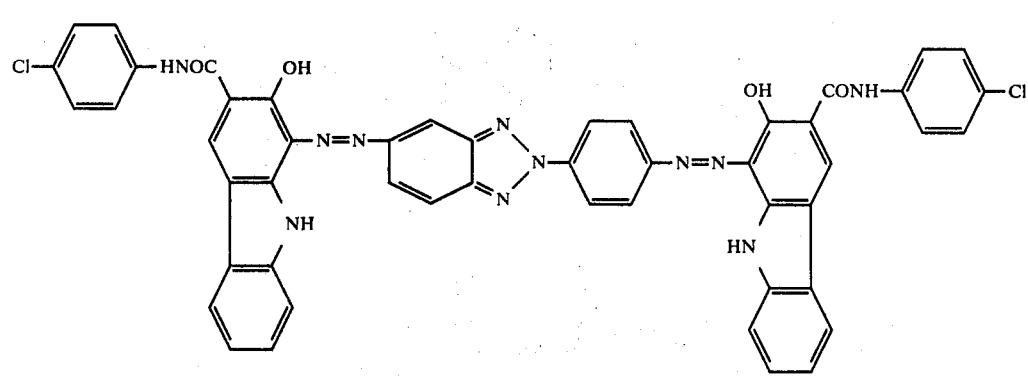
(7) 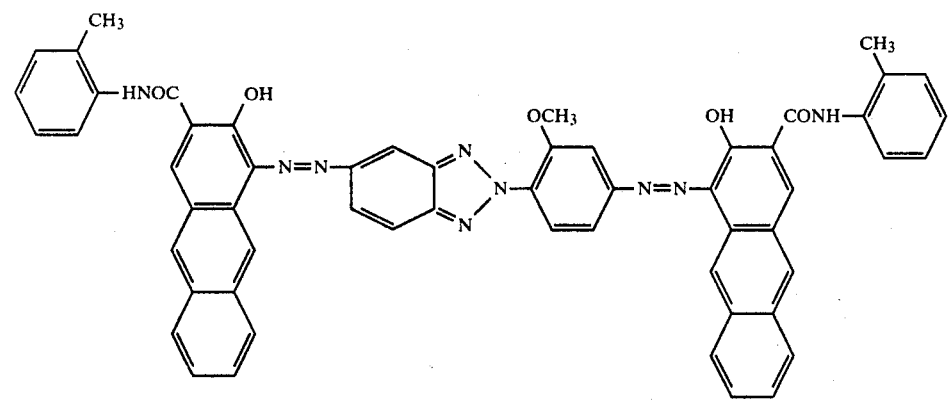
(8) 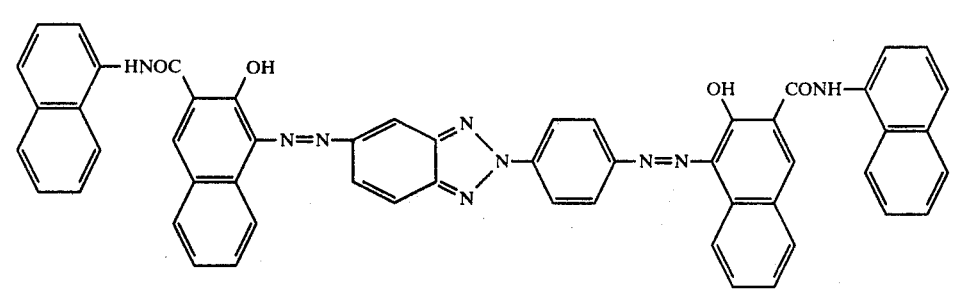
(9)

-continued
| Pigment No. | |
|---|---|
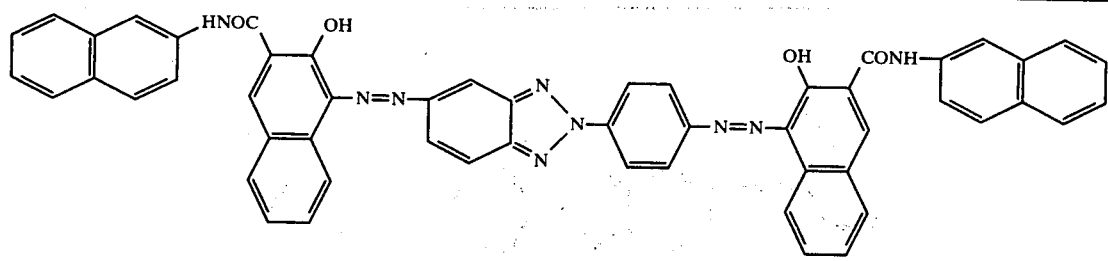
(10)
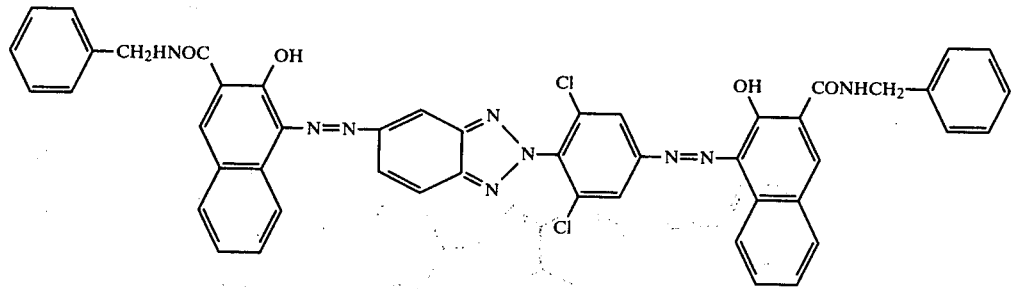
(11)
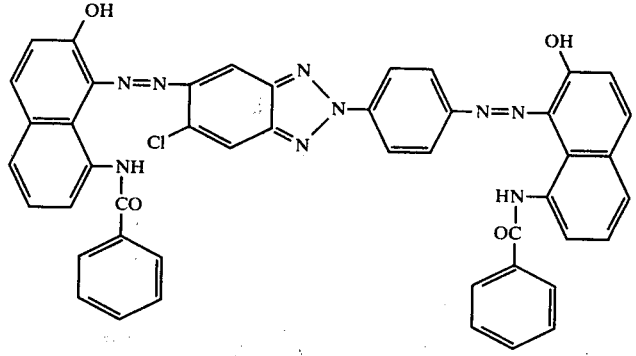
(12)
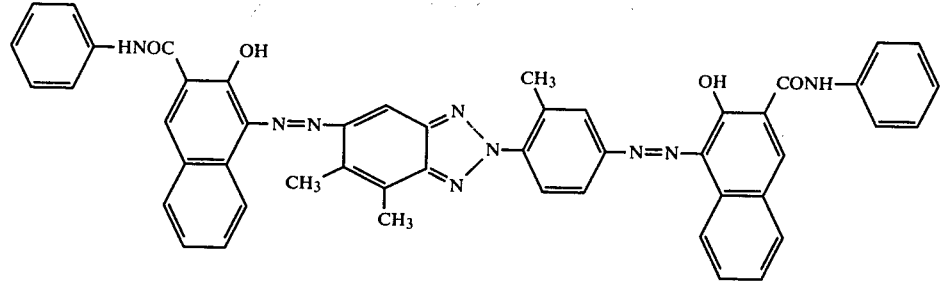
(13)
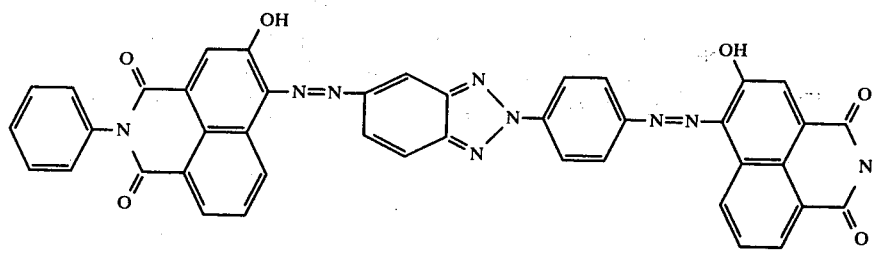

-continued
| Pigment No. | |
|---|---|
| (14) | 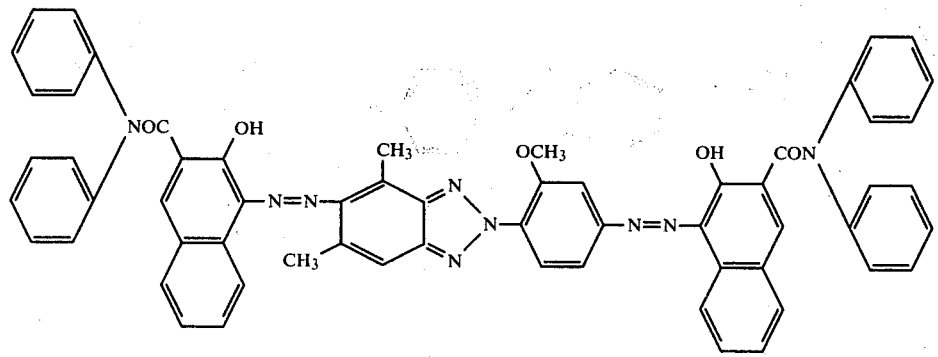 |
| (15) | 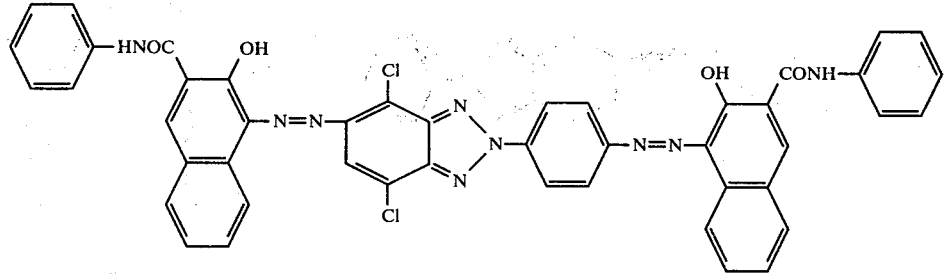 |
| (16) | 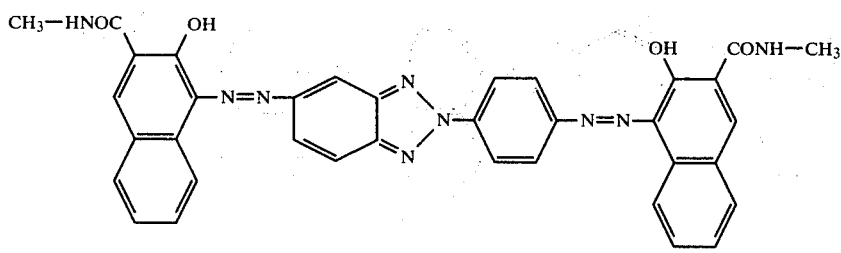 |
| (17) | 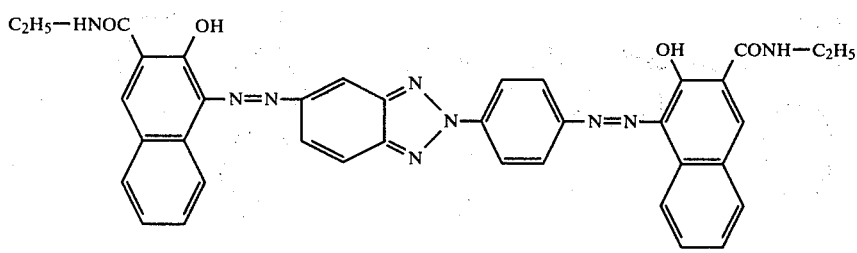 |
| (18) | 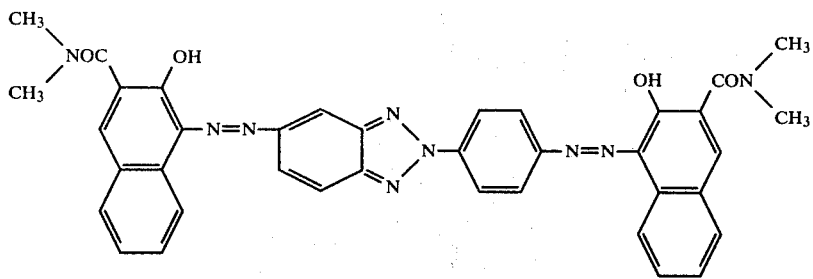 |

-continued
Pigment No.
(19) 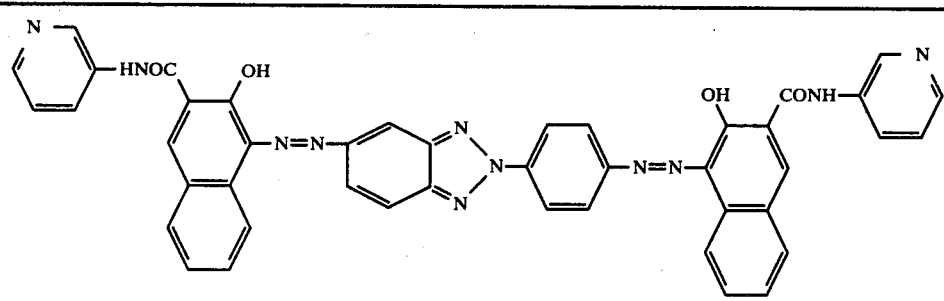
(20) 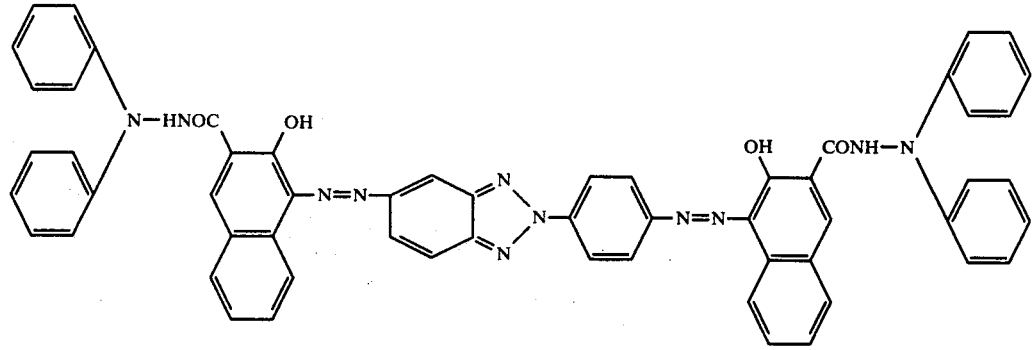
(21) 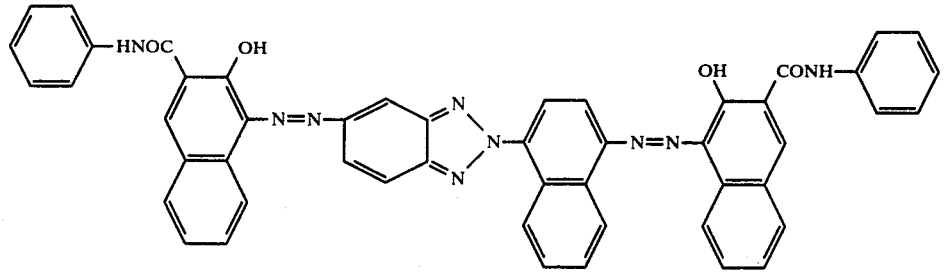
(22) 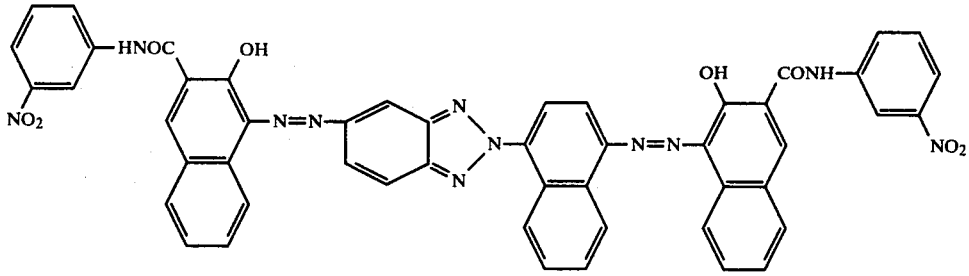
(23) 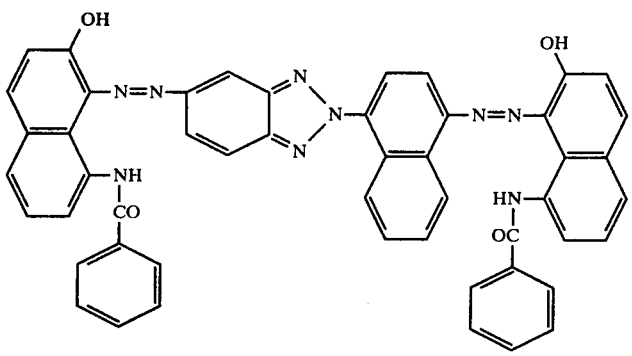

| Pigment No. | |
|---|---|
| (24) | 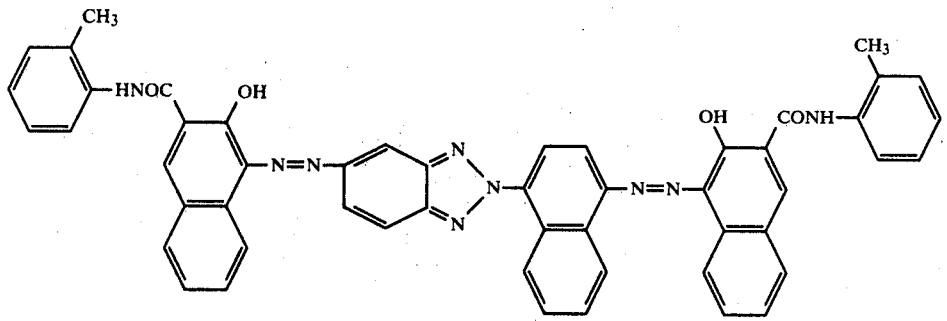 |
| (25) | 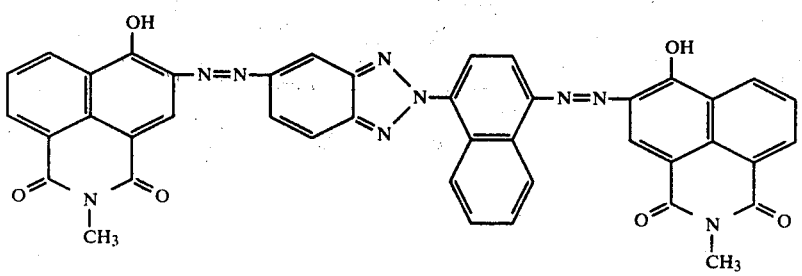 |
| (26) | 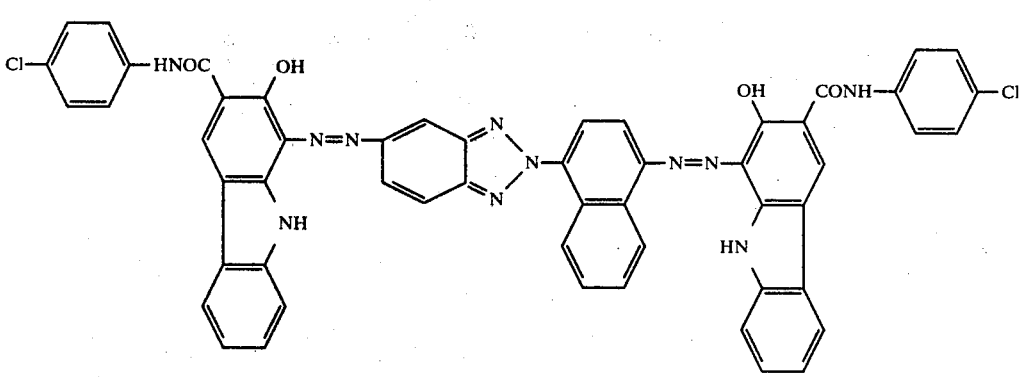 |
| (27) | 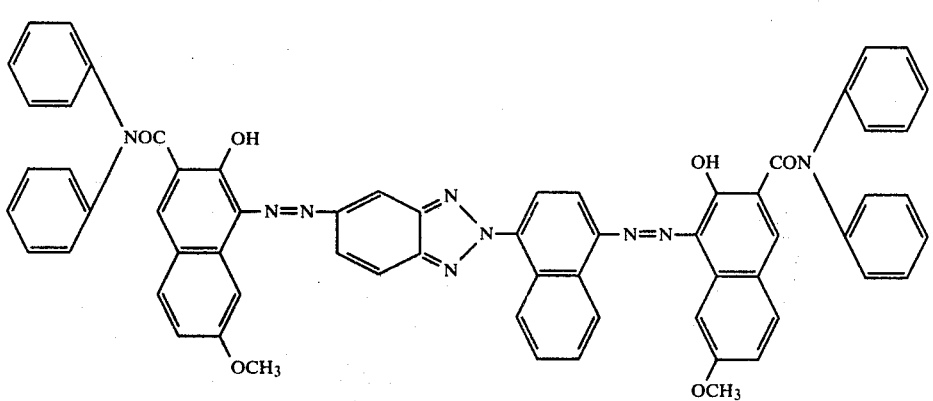 |

-continued
Pigment No.
(28)
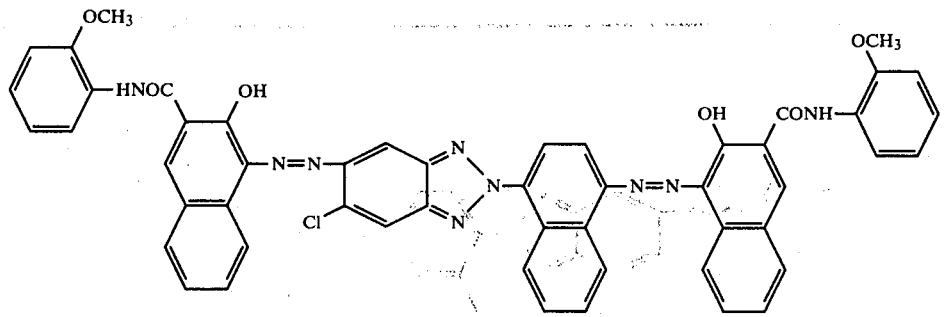
(29)
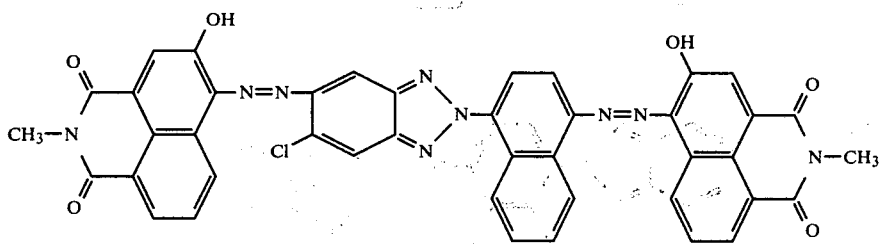
(30)
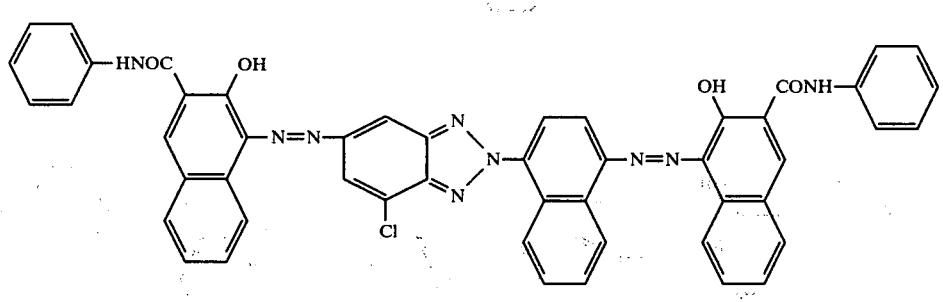
(31)
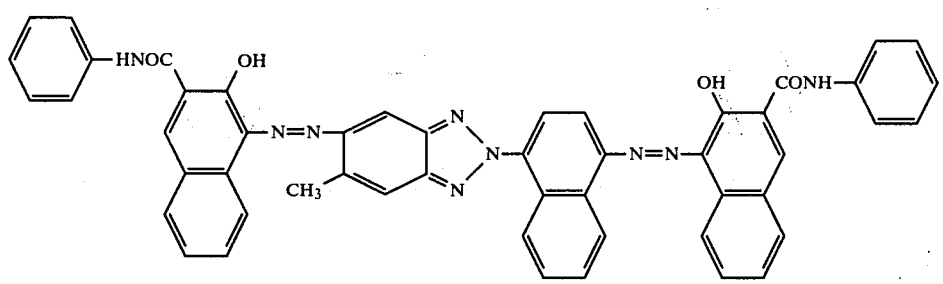
(32)
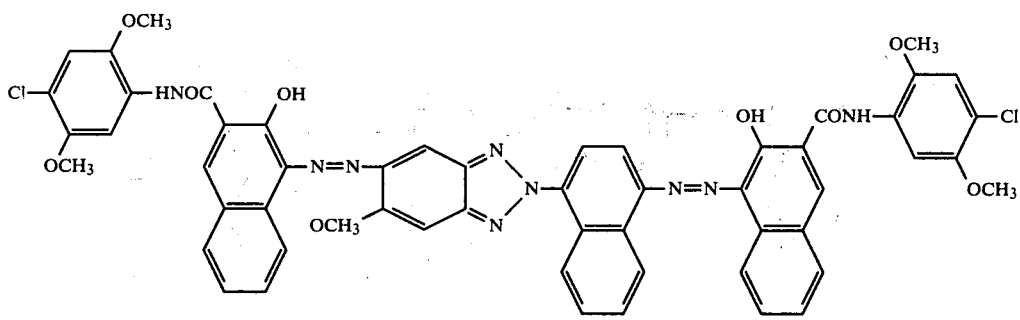

| Pigment No. | |
|---|---|
| (33) | 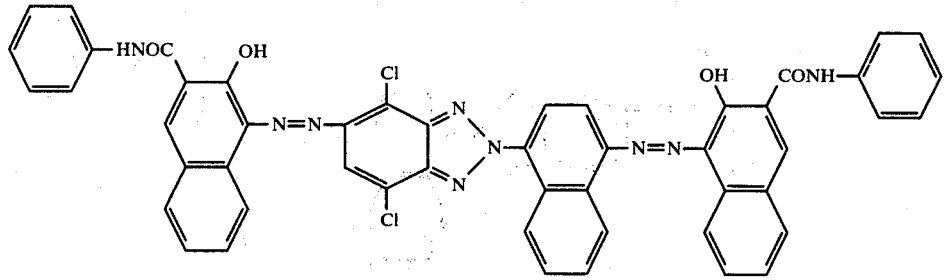 |
| (34) | 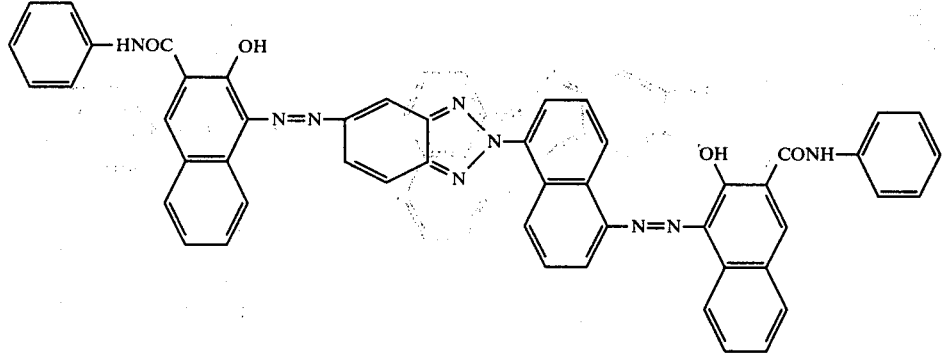 |
| (35) | 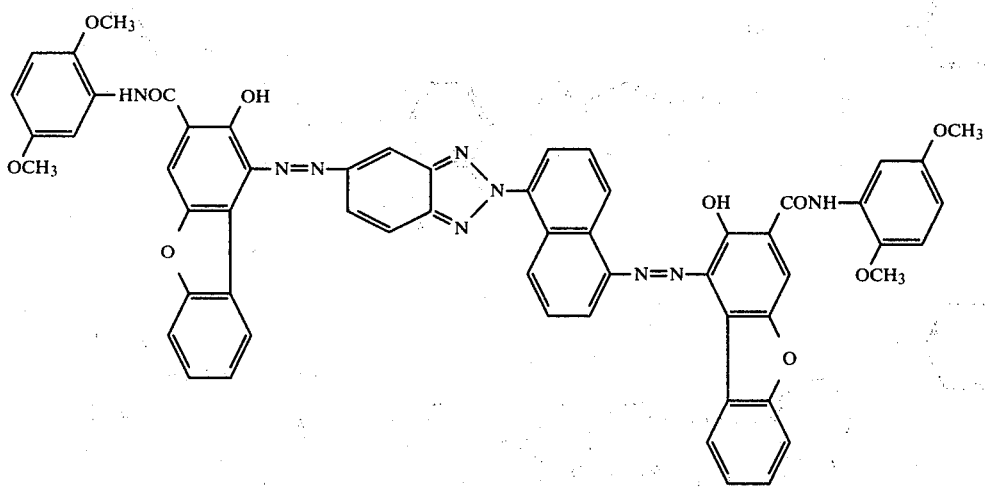 |
| (36) | 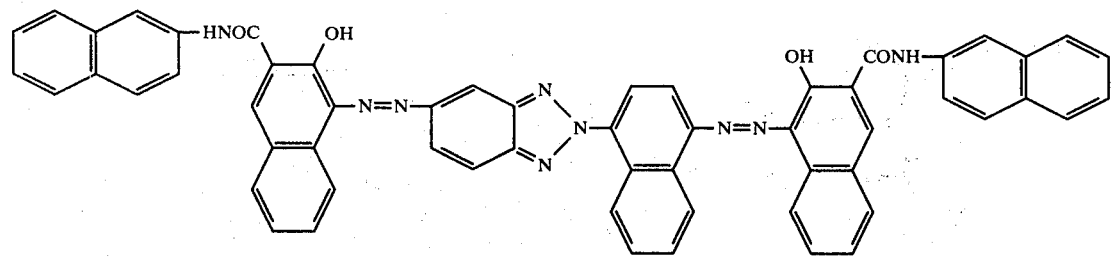 |

-continued
| Pigment No. | |
|---|---|
| (37) | 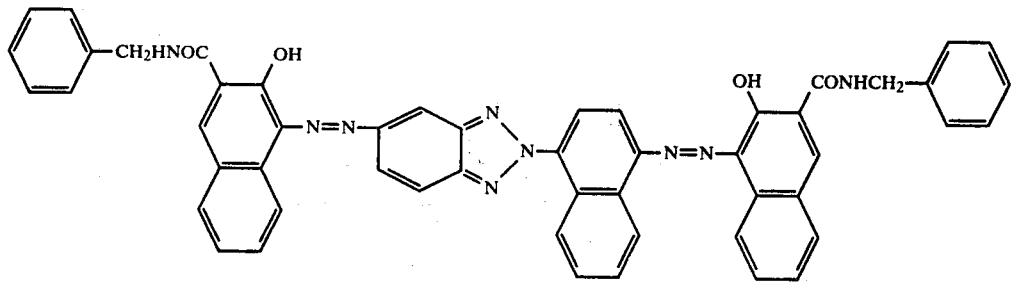 |
| (38) | 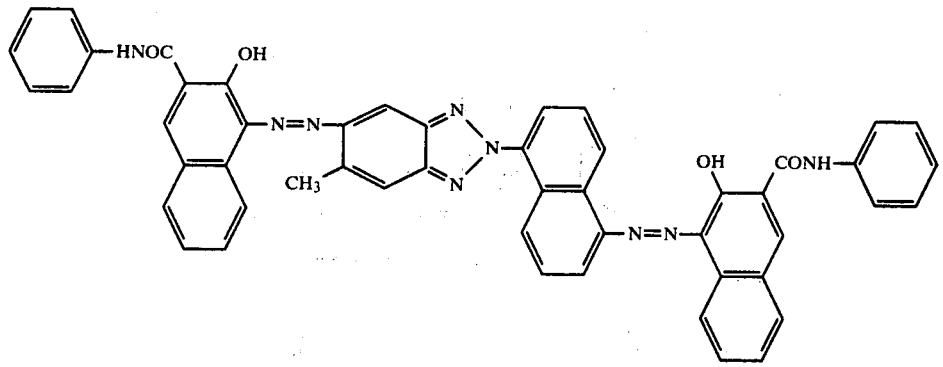 |
| (39) | 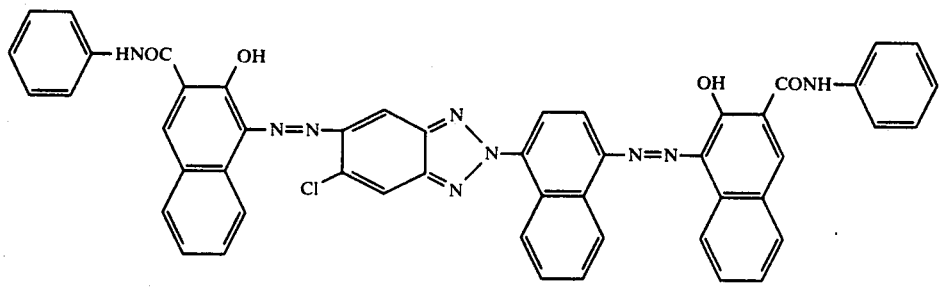 |
| (40) | 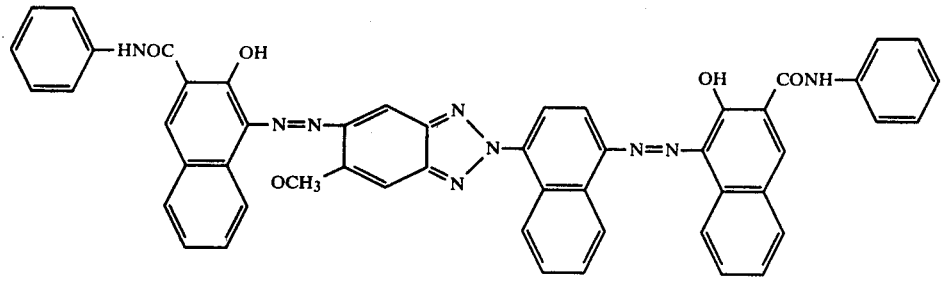 |
| (41) | 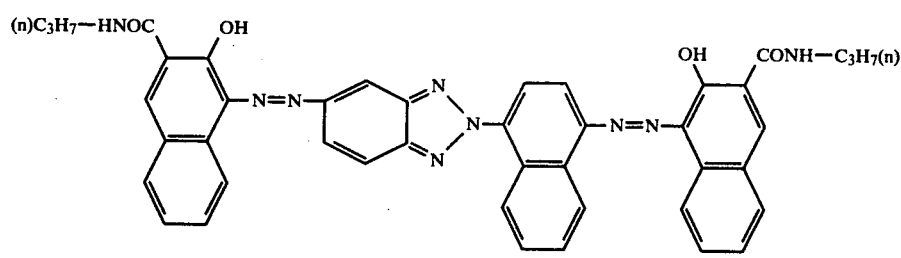 |

| Pigment No. | |
|---|---|
| (42) | 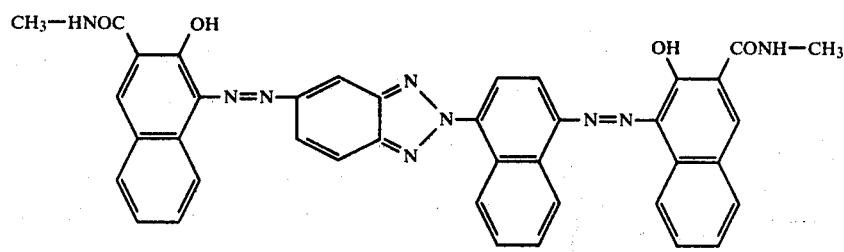 |
| (43) | 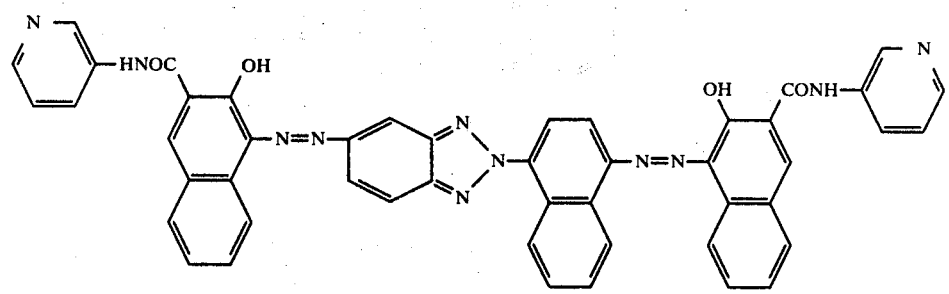 |
| (44) | |
| (45) | 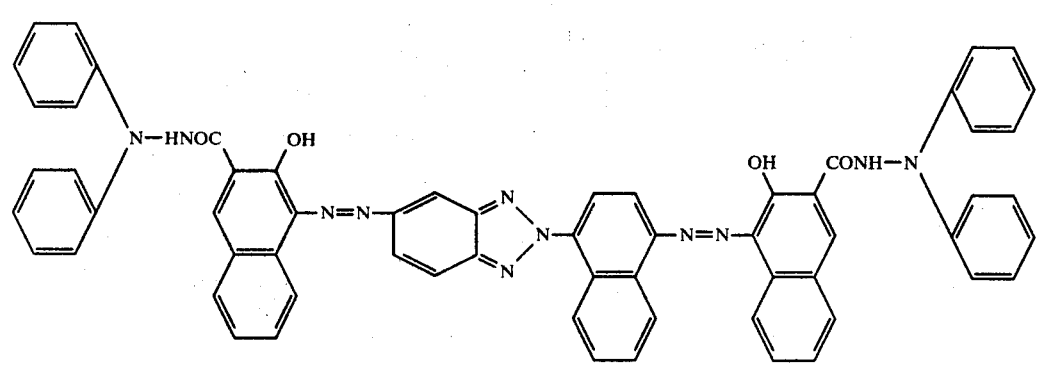 |
Typical disazo pigments represented by Formula (2) are recited as follows:

| Pigment No. | |
|---|---|
| (46) | 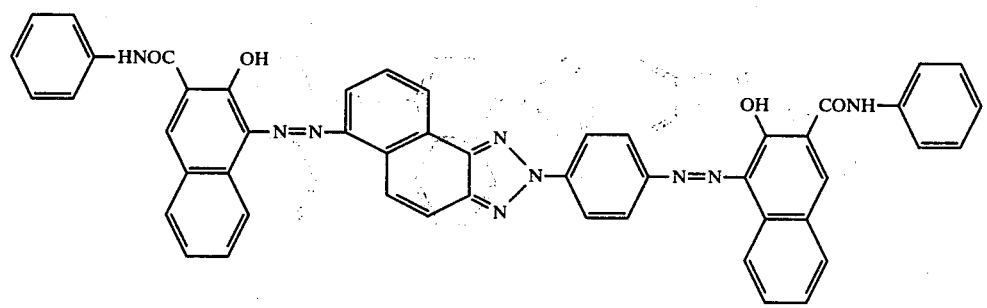 |
| (47) | 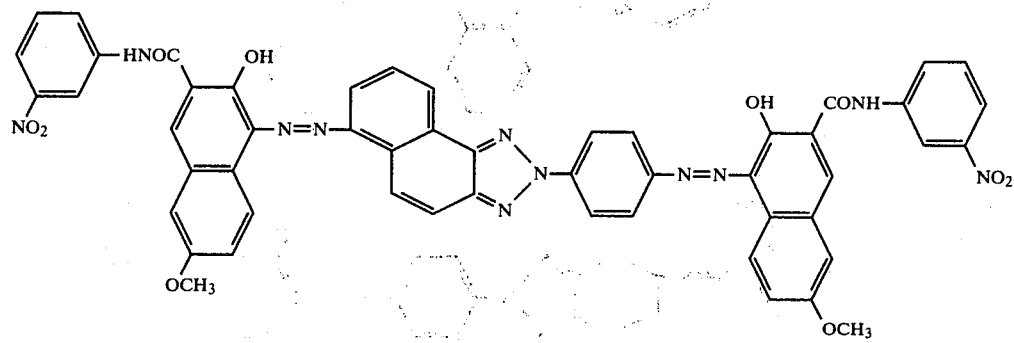 |
| (48) | 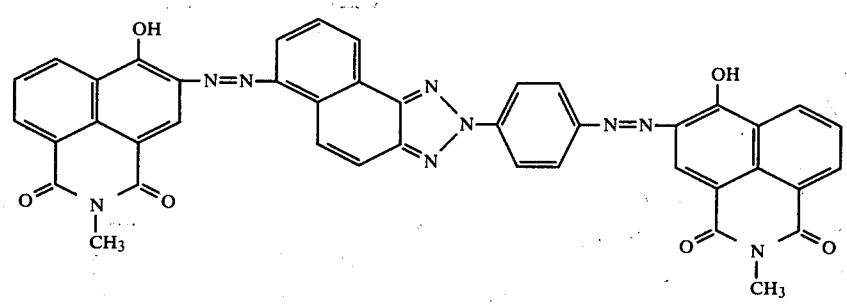 |
| (49) | 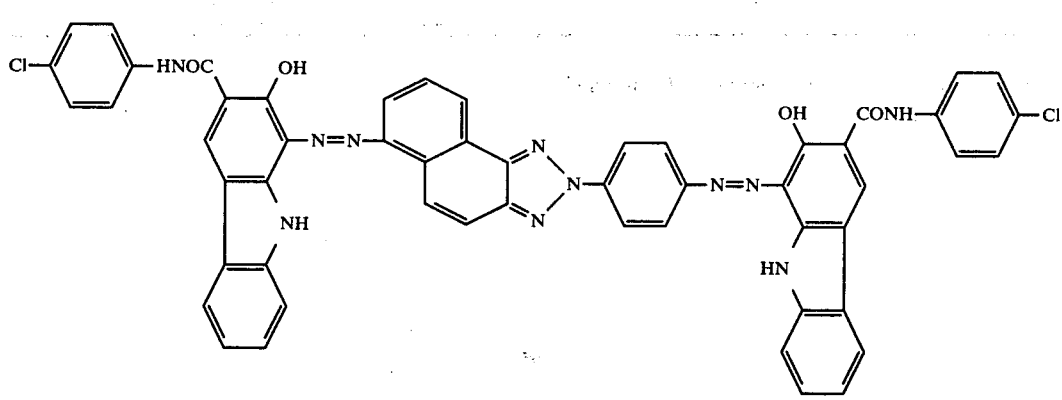 |

-continued
| Pigment No. | |
|---|---|
| (50) | 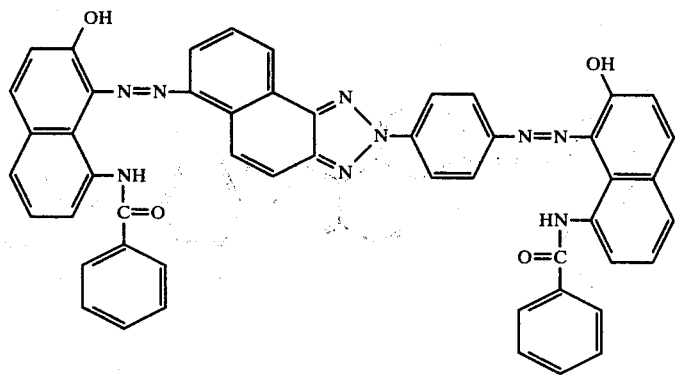 |
| (51) | 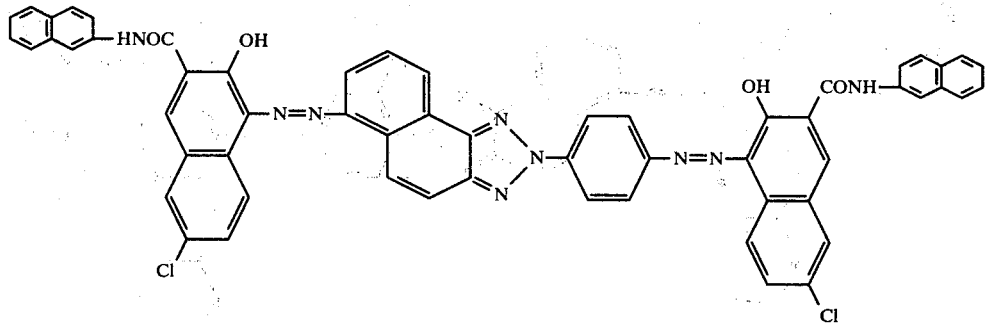 |
| (52) | 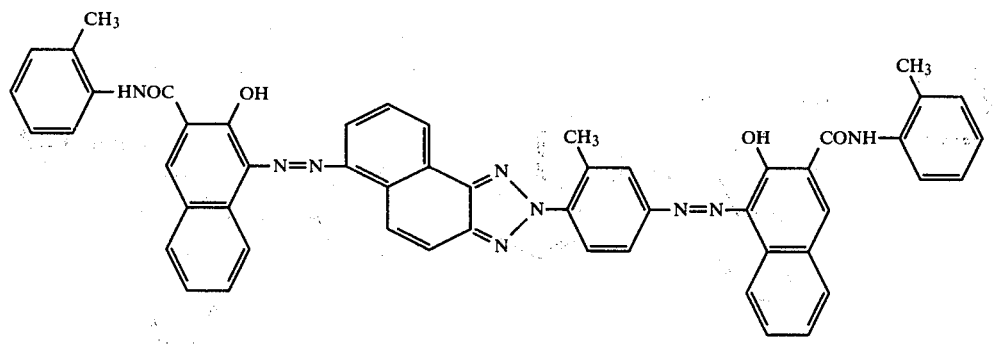 |
| (53) | 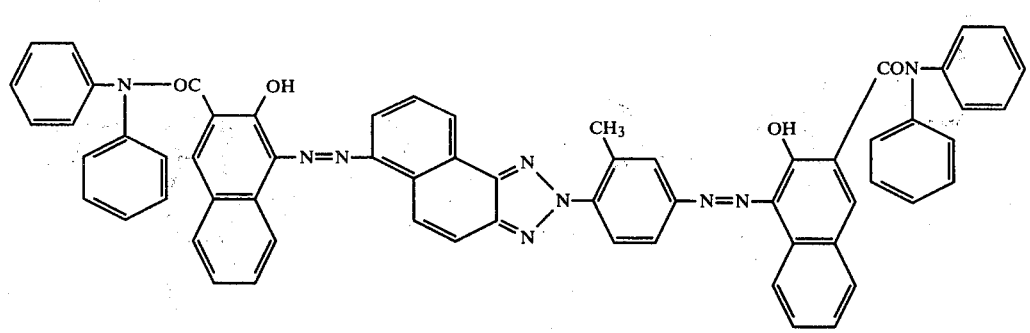 |

| Pigment No. | |
|---|---|
| (54) | 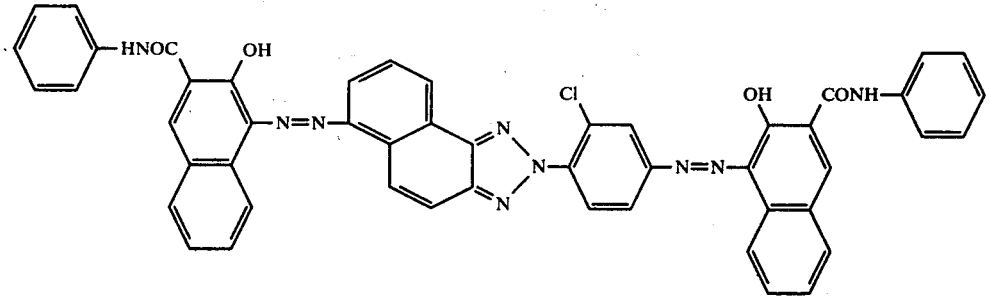 |
| (55) | 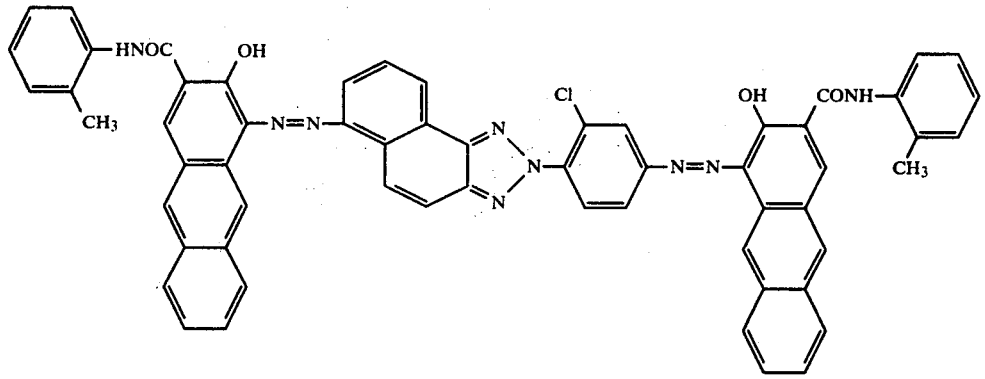 |
| (56) | 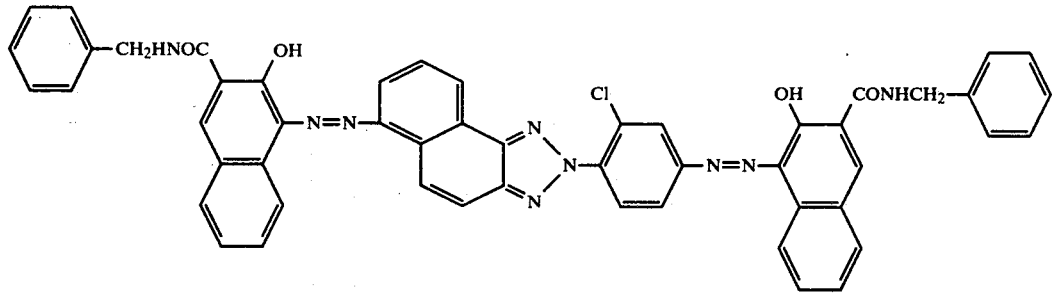 |
| (57) | 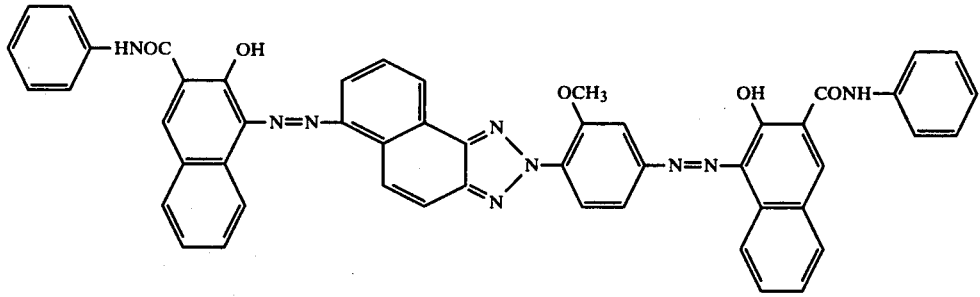 |

-continued
| Pigment No. | |
|---|---|
| (58) | 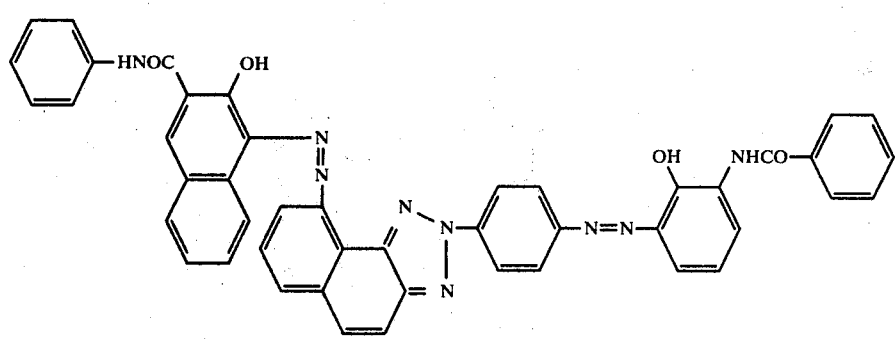 |
| (59) | 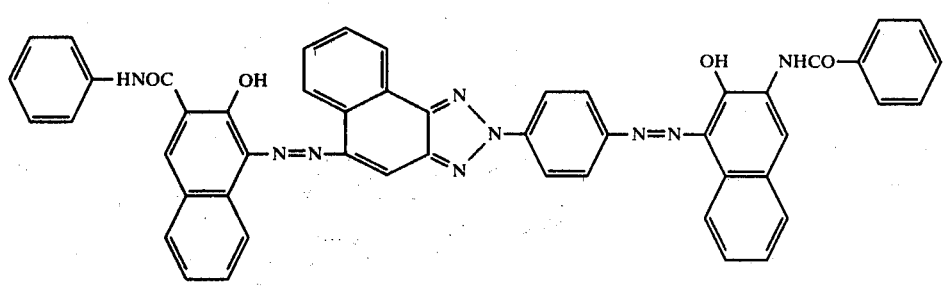 |
| (60) | 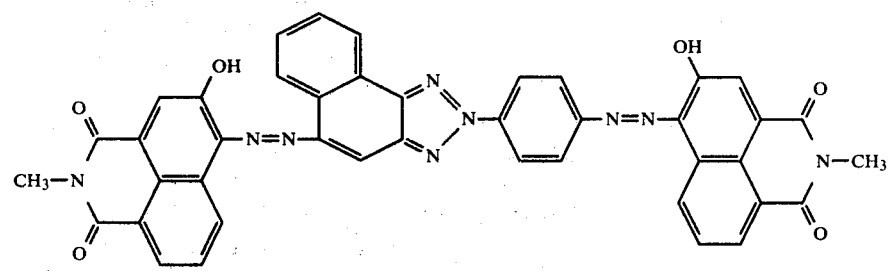 |
| (61) | 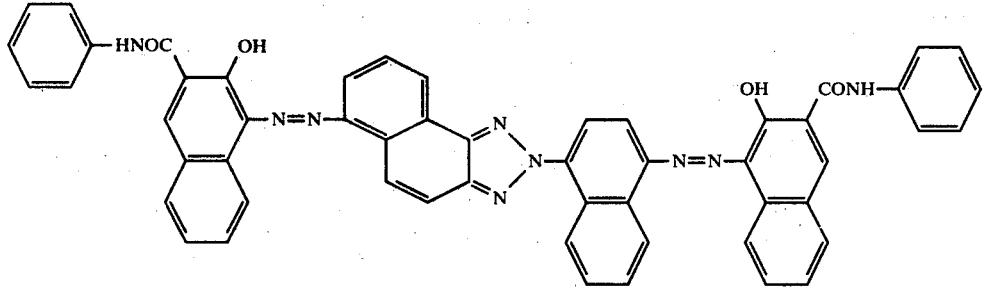 |
| (62) | 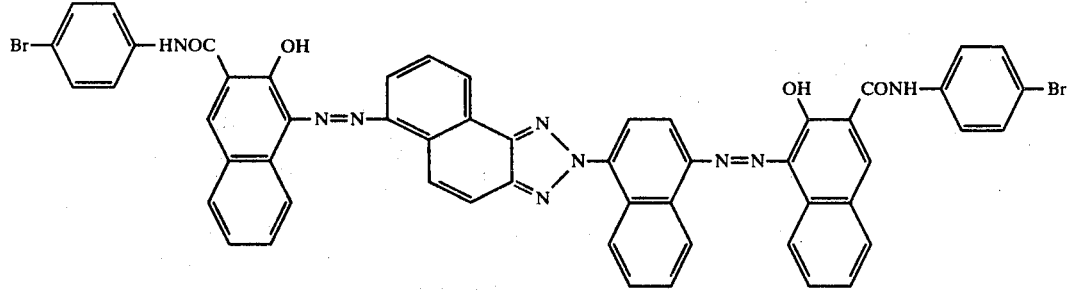 |

| Pigment No. | |
|---|---|
| (63) | 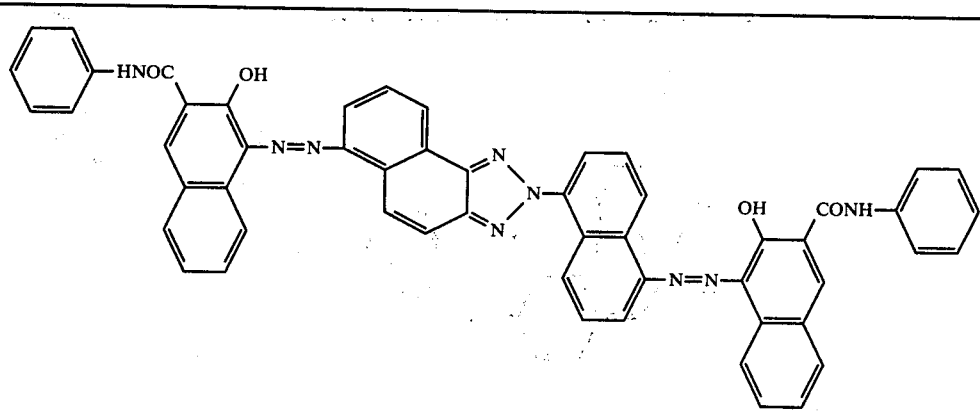 |
| (64) | 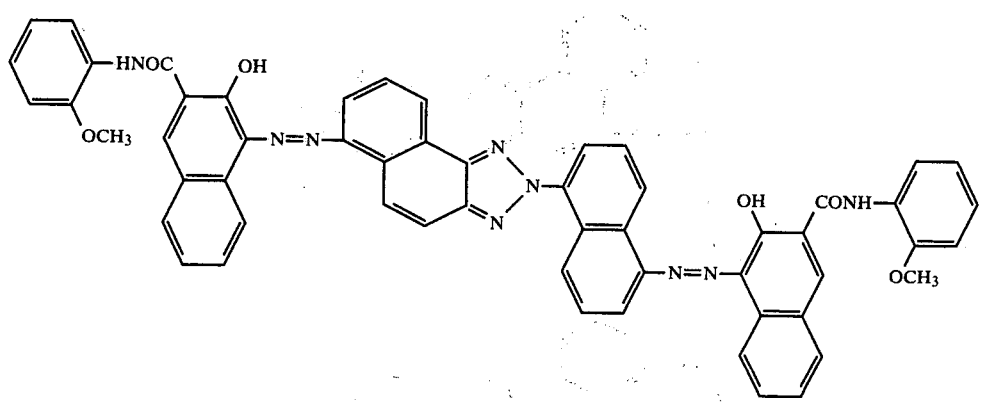 |
| (65) | 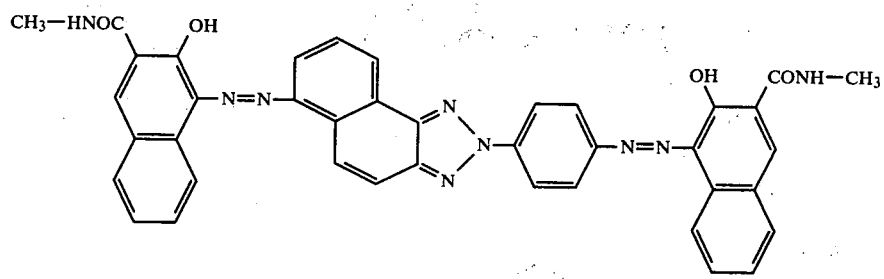 |
| (66) | 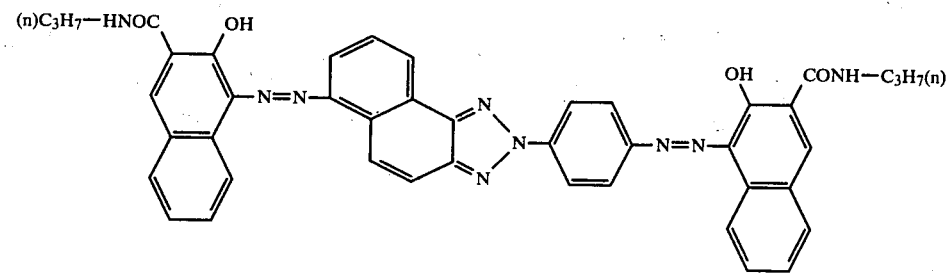 |
| (67) | 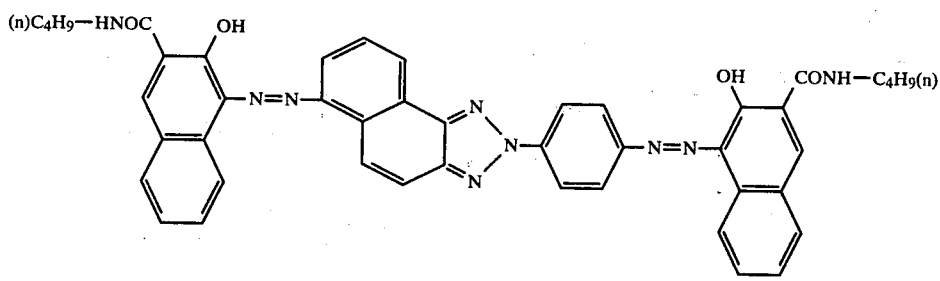 |

-continued
| Pigment No. | |
|---|---|
| (68) | 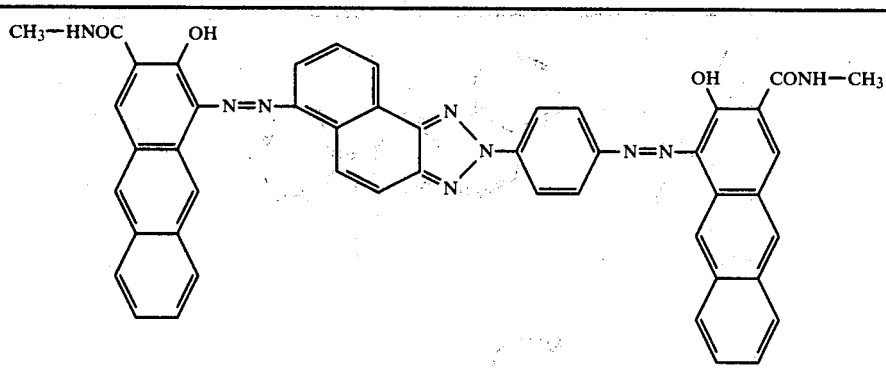 |
| (69) | 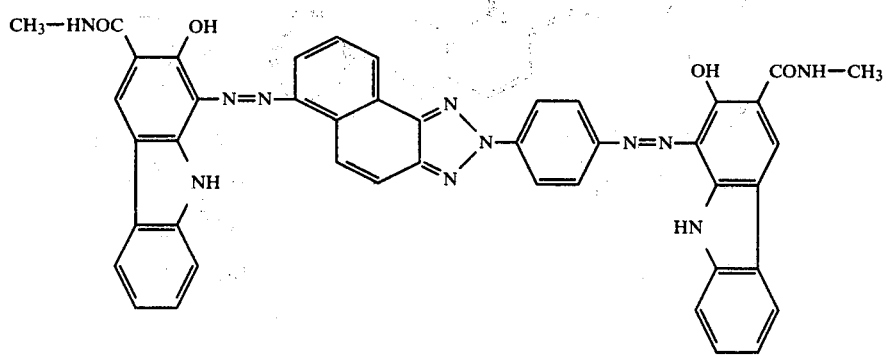 |
| (70) | 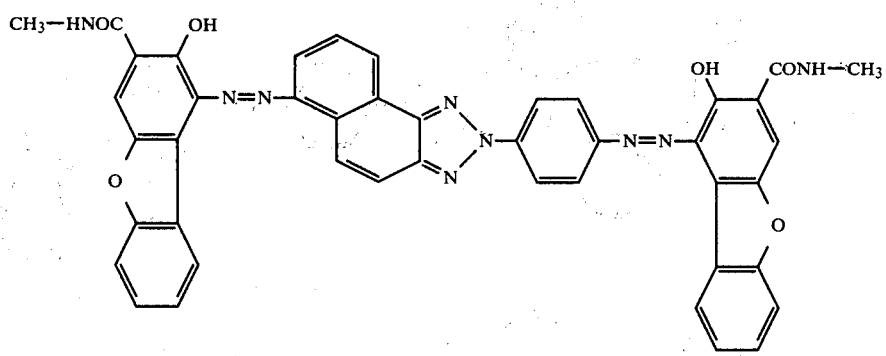 |
| (71) | 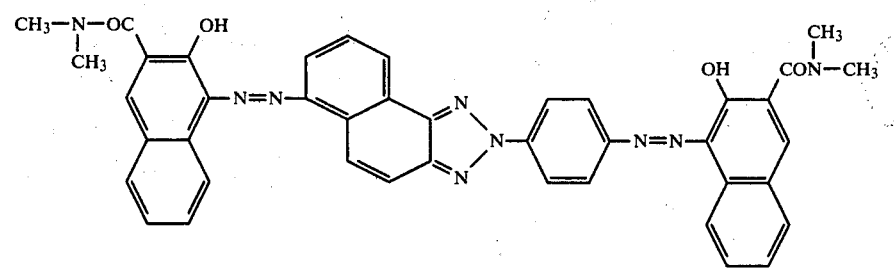 |
| (72) | 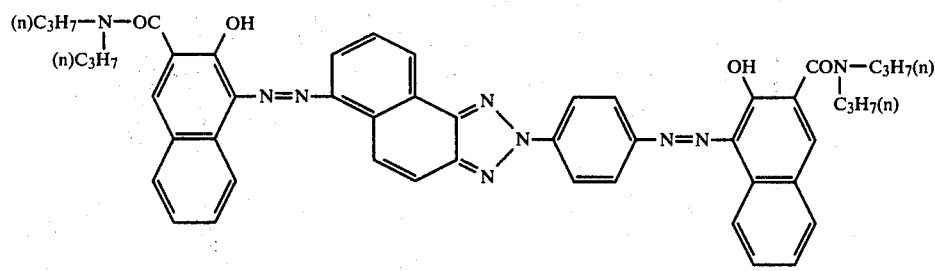 |

-continued
| Pigment No. | |
|---|---|
| (73) | 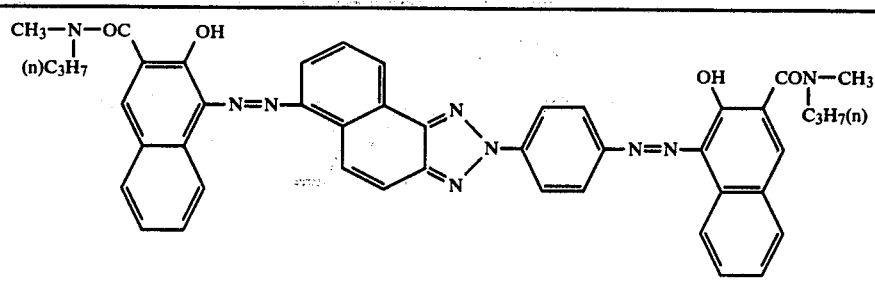 |
| (74) | 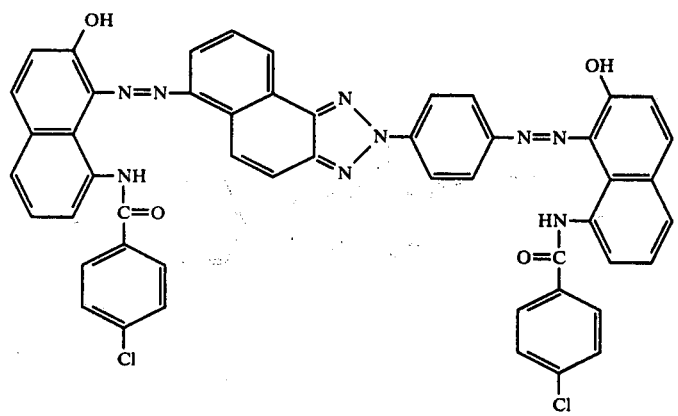 |
| (75) | 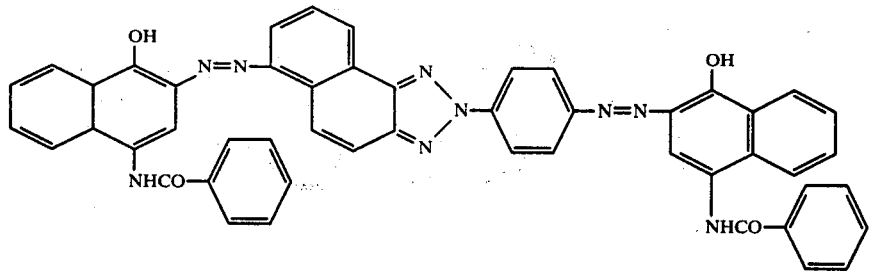 |
| (76) | 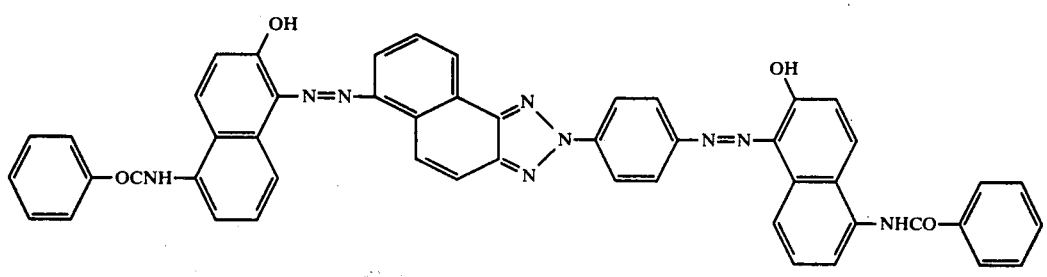 |
| (77) | 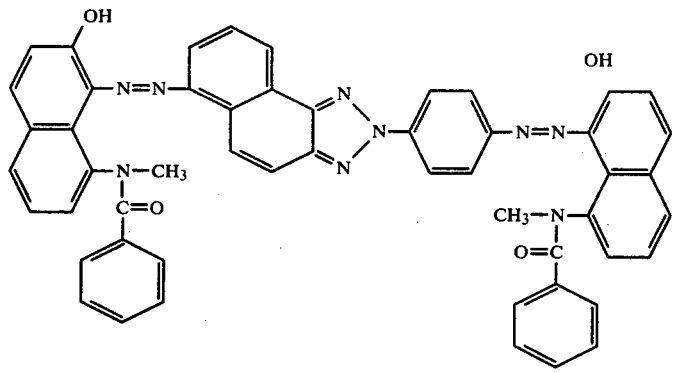 |

-continued
Pigment No.
(78) 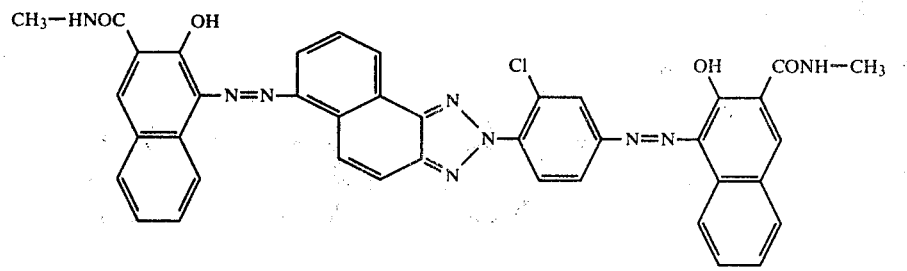
(79) 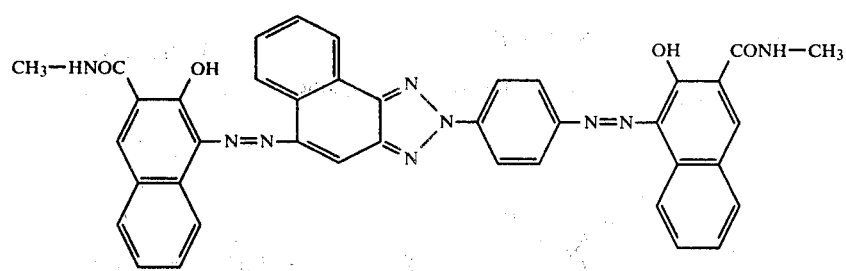
(80) 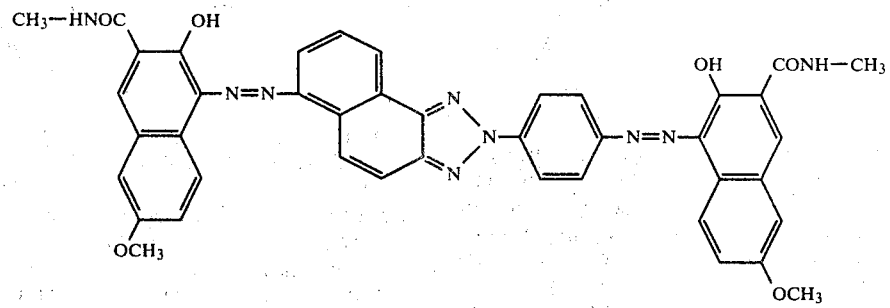
(81) 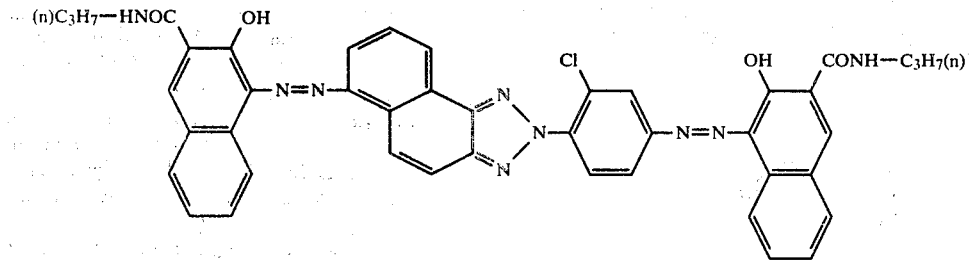
(82) 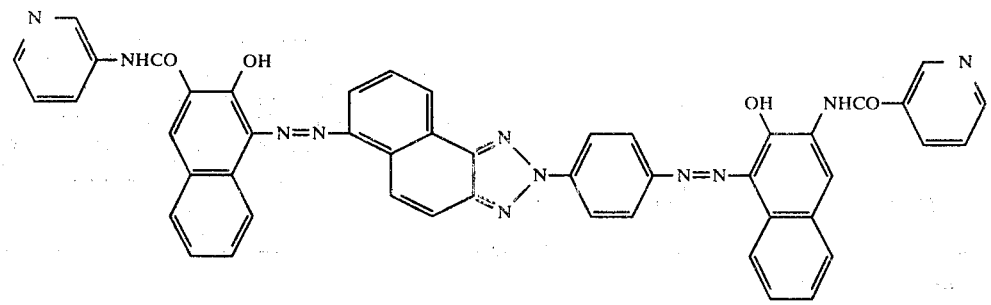

| Pigment No. | |
|---|---|
| (83) | 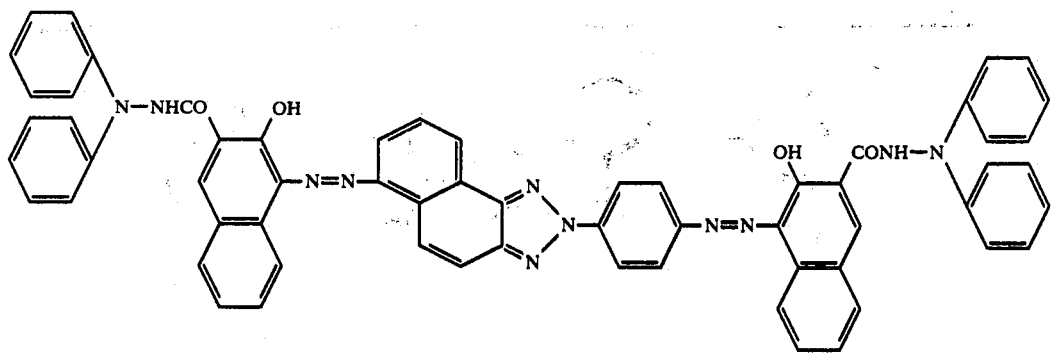 |

These disazo pigments can be synthesized with ease in the following way:

For example, a diamine compound represented by the following formula (8) or (9), used as the starting material, is converted into its tetrazonium salt by the ordinary method, followed by coupling in the presence of an alkali with a coupler from which a coupler residue represented by formula (3) to (7) can be derived. Alternatively, a tetrazonium salt of said diamine, represented by the following formula (8) or (9), after once isolated in a form of boronfluoride salt or zinc chloride double salt, is coupled with a coupler in a suitable solvent such as N,N-dimethylformamide or dimethylsulfoxide, in the presence of an alkali.

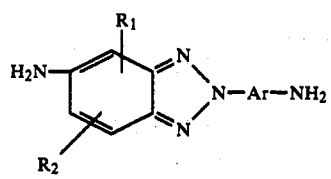 (8)

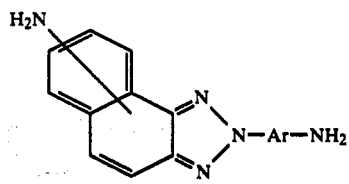 (9)

$R_1$, $R_2$, and Ar, in formula (8) or (9), are as defined above.

Examples of synthetic process for disazo pigments used in this invention are given below.

Synthesis Example 1

Synthesis of the compound:

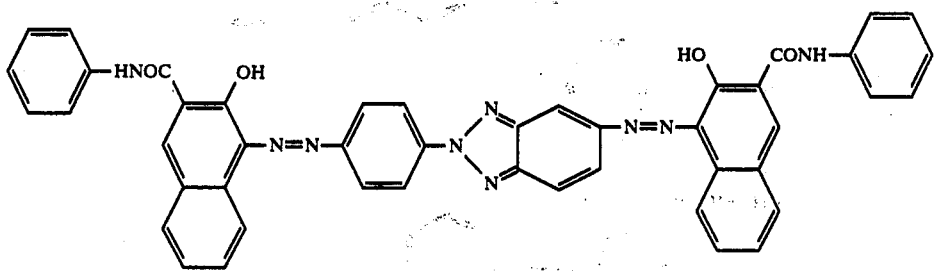

A mixture of 7.0 g (0.0311 mole) of 5-amino-2-(p-aminophenyl)-1,3-benzotriazole, 25 ml (0.2832 mole) of conc. hydrochloric acid, and 200 ml of water was cooled down to 4° C., and a solution of 4.5 g (0.0653 mole) of sodium nitrite in 12 ml of water was dropped thereinto during 15 minutes. The mixture was stirred for 30 minutes while keeping its temperature at 4°-6° C., and after addition of active carbon, it was filtered to obtain an aqueous solution of tetrazonium.

The aqueous solution of tetrazonium was added dropwise to a solution of 27.3 g (0.684 mole) of sodium hydroxide and 18.0 g (0.0684 mole) of 2-hydroxy-3-naphthoic acid halide in 720 ml of water at 5°-10° C. during 30 minutes. The mixture was stirred for one hour and then allowed to stand overnight. The resulting reaction mixture was filtered, and the pigment obtained was washed with water and then acetone, and dried to obtain 16.5 g of a crude pigment.

Then, the crude pigment was washed successively with DMF (dimethylformamide) and tetrahydrofuran, and dried. Thus, 12.4 g of red pigment was obtained.

| Yield of purified product based on the diamine: 51.5% | |
|---|---|
| Decomposition point: 300° C. or more | |
| Spectrum of pigment in o-dichlorobenzene: $\lambda_{max}$ = 578 nm | |
| IR spectrum: 1670 cm$^{-1}$ (secondary amide) | |
| Elementary analysis: (molecular formula $C_{48}H_{31}N_9O_4$) | |
| Calcd. (%) | Found (%) |
| C  72.27 | 72.36 |
| H  3.89 | 3.77 |
| N  15.81 | 15.87 |

Synthesis Example 2

Synthesis of the compound:

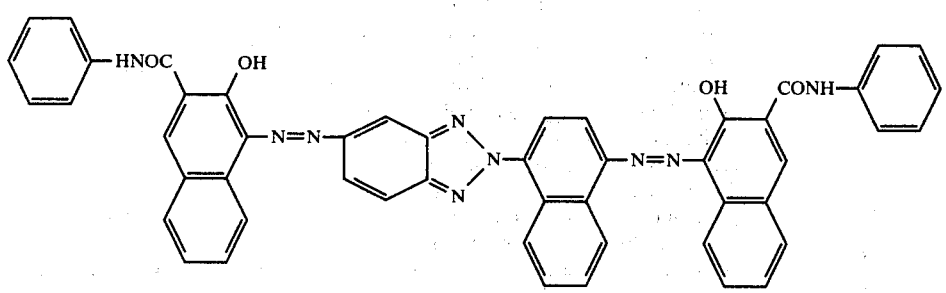

A dispersion consisting of 6.5 g (0.0236 mole) of 5-amino-2-(4-amino-1-naphthyl)-benzotriazole, 14.6 ml of conc. hydrochloric acid, and 140 ml of water was cooled down to 3° C., and a solution of 3.4 g (0.0496 mole) of sodium nitrite in 10 ml of water was dropped thereinto during 15 minutes. The mixture was stirred for 30 minutes while keeping its temperature at 3°-5° C., and after addition of active carbon, it was filtered to obtain an aqueous tetrazonium.

The aqueous solution of tetrazonium was dropped to a solution prepared by dissolving 19.8 g of sodium hydroxide and 13.1 g (0.0496 mole) of 2-hydroxy-3-naphthoic acid anilide in 500 ml of water, keeping at 5°-7° C. for 15 minutes. The mixture was stirred for one hour and allowed to stand overnight.

The pigment obtained by filtration of the coupling product mixture was washed with water and then acetone, and dried to obtain 14.6 g of a crude pigment.

This crude pigment was then washed successively with dimethylformamide and tetrahydrofuran, and dried. Thus, 11.1 g of a purified pigment was obtained.

| Yield of purified product based on the diamine: 57% | | |
|---|---|---|
| Decomposition point: 300° C. or more | | |
| Elementary analysis: (molecular formula $C_{50}H_{33}N_9O_4$) | | |
| | Calcd. (%) | Found (%) |
| C | 72.88 | 72.76 |
| H | 4.05 | 4.16 |
| N | 15.30 | 15.21 |

IR Spectrum: 1670 cm$^{-1}$ (secondary amide)

Synthesis Example 3

Synthesis of the compound:

A dispersion consisting of 7.2 g (0.026 mole) of 2-(4-aminophenyl)-5'-amino-(naphtho-1',2',4,5-triazole) (this diamine was synthesized according to the method described by Morgan Gilmour in J. Soc. Chem. Ind. 41, 61T; C. 1922 III 916), 15.0 ml of conc. hydrochloric acid, and 150 ml of water was cooled down to 3° C., and a solution of 3.8 g (0.0546 mole) of sodium nitrite in 11 ml of water was dropped thereinto during 10 minutes. The mixture was stirred at 4°-7° C. for 30 minutes, and after addition of active carbon, was filtered to obtain an aqueous tetrazonium.

The aqueous solution of tetrazonium was dropped to a solution prepared by dissolving 21.8 g of sodium hydroxide and 14.4 g (0.0546 mole) of 2-hydroxy-3-naphthoic acid anilide in 550 ml of water, keeping at 5°-8° C., during 20 minutes. The mixture was stirred for further one hour and allowed to stand overnight.

The pigment obtained by filtering the reaction mixture was washed with water and then acetone, and dried to obtain a crude pigment. It was then washed successively with dimethylformamide and tetrahydrofuran, and dried. Thus, 14.5 g of a purified pigment was obtained.

| Yield based on the diamine: 60% | | |
|---|---|---|
| Decomposition point: 300+ C. or more | | |
| Elementary analysis: (molecular formula $C_{50}H_{33}N_9O_4$) | | |
| | Calcd. (%) | Found (%) |
| C | 72.8 | 72.49 |
| H | 4.05 | 4.14 |
| N | 15.30 | 15.13 |

IR spectrum: 1670 cm$^{-1}$ (secondary amide)

Other disazo pigments represented by formula (I) can be synthesized in a way similar to the above Synthesis Examples.

The electrophotographic photosensitive member of this invention can be produced by preparing a charge-

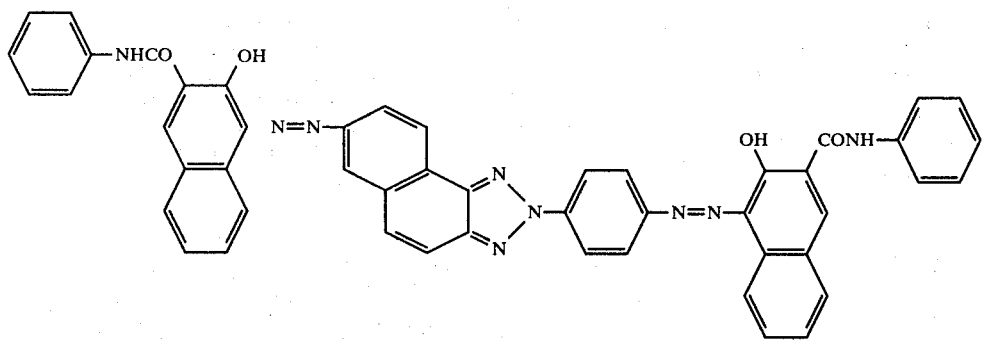

generating material containing a disazo pigment described above, coating this charge-generating material on a suitable substrate to form a charge generation layer, and laminating a charge transport layer, which will be described later, on the charge generation layer. This type of electrophotographic photosensitive member may have an intermediary layer between a suitable substrate and a charge generation layer containing said disazo pigment, said charge generation layer being overlaid with a charge transport layer. This intermediary layer acts to bar the injection of free electric charges from the conductive substrate into the laminate photosensitive layer when the photosensitive member is charged, and additionally acts as a bond layer to hold the photosensitive layer integrally bound to the conductive substrate. The materials for use as this intermediary layer include metal oxides such as aluminum oxide and organic polymers such as polyethylene, polypropylene, acrylic resins, methacrylic resins, vinyl chloride resin, phenolic resins, epoxy resins, polyester resins, alkyd resins, polycarbonates, polyurethanes, polyimide resins, vinylidene chloride resin, vinyl chloride-vinyl acetate copolymer, casein, gelatin, poly(vinyl alcohol), water-soluble ethylene-acrylic acid copolymer, nitrocellulose, and hydroxy propylcellulose. The thickness of this intermediary or bond layer is generally $0.1-5\mu$, preferably $0.5-3\mu$.

A laminate-structure comprising a charge generation layer laid over a charge transport layer can also be adopted in this invention, and in this case the charge generation layer may be coated with a suitable surface-protecting layer.

In this invention, the formation of charge generation layer from said disazo pigment can be accomplished by vacuum deposition, sputtering, glow discharge, etc. The formation is also effected by dispersing said disazo pigment in a suitable binder and coating this dispersion liquid in suitable coating way. Besides these, a binder-free charge generation layer, containing said disazo pigment, can be formed as well. For dispersing said disazo pigment, known devices such as ball mills and attriters are available. The particle size of the pigment in the dispersion is generally up to $5\mu$, more preferably up to $2\mu$, and most preferably up to $0.5\mu$. Further, said disazo pigment can be applied in a form of solution in an amine group solvent such as ethylenediamine, diethylenetriamine, tetraethylenepentamine, pentaethylenehexamine, diethylaminopropylamine, N-aminoethylpiperazine, benzyldimethylamine, α-methylbenzyldimethylamine, or tridimethylaminomethylphenol. For the coating, conventional ways are applicable such as blade coating, Meyer bar coating, spray coating, dip coating, bead coating, air knife coating, and curtain coating.

The thickness of charge generation layer in this invention is generally up to $5\mu$, preferably $0.01-1\mu$.

The binders used as a dispersion medium for the pigment include poly(vinyl butyral), poly(methyl methacrylate), polyesters, poly(vinylidene chloride), polyamides, chlorinated rubber, polyvinyltoluene, polystyrene, poly(vinyl chloride), ethylcellulose, polyvinylpyridine, and styrene-maleic anhydride copolymer. The binder content in the charge generation layer is up to 80%, preferably up to 50%, based on the charge generation layer by weight.

The charge transport layer in this invention is preferably formed by coating a suitable solvent in which a charge transporting compound and a binder have been dissolved, and drying the coating. The binders usable in this case include, for example, polysulfone, acrylic resins, methacrylic resins, vinyl chloride resin, vinyl acetate resin, phenolic resins, epoxy resins, polyesters, alkyd resins, polycarbonates, polyurethans and copolymers containing two or more kinds of repeating units of these resins. In particular, polyesters and polycarbonates are preferable. Photoconductive polymers, such as poly(N-vinylcarbazole), having a charge-transporting function can also be used as the binder.

The mixing ratio of binder to charge-transporting compound is desirable 100 parts by weight to 10-500 parts by weight. Thickness of the charge transport layer is generally $2-100\mu$, preferably $5-30\mu$. For coating to form the charge transport layer, usual methods can be used such as blade coating, Meyer-bar coating, spray coating, dip coating, bead coating, air knife coating, and curtain coating.

A wide variety of organic solvents can be used for the coating solution for forming the charge transport layer of this invention. Typical examples thereof are aromatic hydrocarbons such as benzene, toluene, xylene, mesitylene, chlorobenzene, and the like; ketones such as acetone, 2-butanone, and the like; halogenated aliphatic hydrocarbons such as methylene chloride, chloroform, ethylene chloride, and the like; cyclic or linear ethers such as tetrahydrofuran, ethyl ether, and the like; and mixtures of these solvents.

The charge transport layer in this invention can also contain a variety of additives such as, for example, diphenyl, chlorinated diphenyl, o-terphenyl, p-terphenyl, dibutyl phthalate, dimethylglycol phthalate, dioctyl phthalate, triphenyl phosphate, methylnaphthalene, benzophenone, chlorinated paraffin, dilauryl thiopropionate, 3,5-dinitrosalicylic acid, fluorocarbons, silicone oil, silicone rubber, and further phenolic compounds such as dibuthylhydroxytoluene, 2,2'-methylene-bis-(6-t-butyl-4-methylphenol), α-tocopherol, 2-t-octyl-5-chlorohydroquinone, and 2,5-di-t-octylhydroquinone.

In the charge transporting materials used in the electrophotographic photosensitive member of this invention, there are electron-transporting materials and hole-transporting materials. The electron-transporting materials include electron attractive materials such as chloranil, bromanil, tetracyanoethylene, tetracyanoquinodimethane, fluorenones (e.g., 2,4,7-trinitro-9-fluorenone, 2,4,5,7-tetranitrofluorenone, and 2,4,7-trinitro-9-dicyanomethylenefluorenone), and xanthones (e.g., 2,4,5,7-tetranitroxanthone and 2,4,8-trinitrothioxanthone); and high molecular substances derived from these electron attractive materials.

The following compounds can be cited as suitable hole-transporting materials for use in this invention.

Hydrazones

-continued
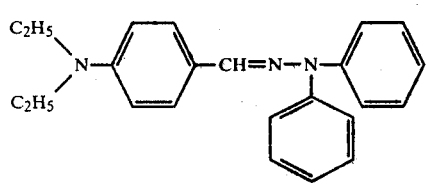 (1)
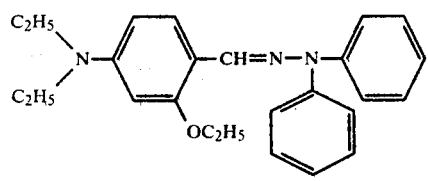 (2)
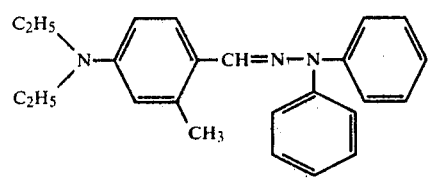 (3)
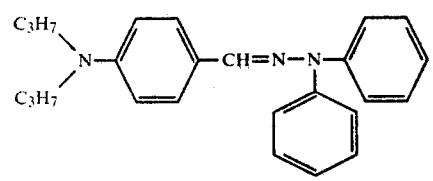 (4)
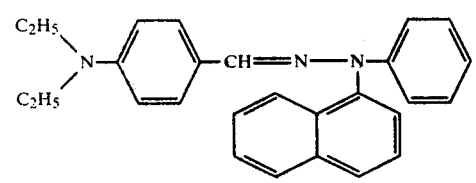 (5)
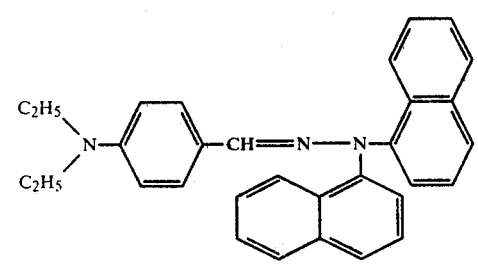 (6)
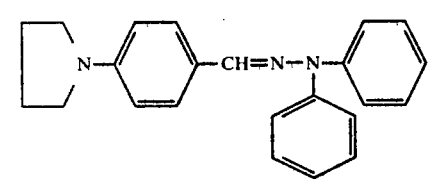 (7)
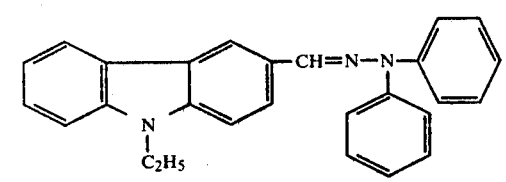 (8)

-continued
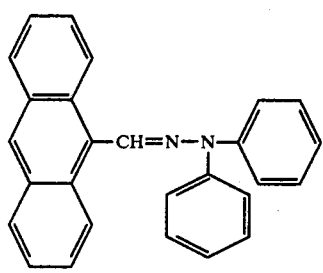
(9)
(10)
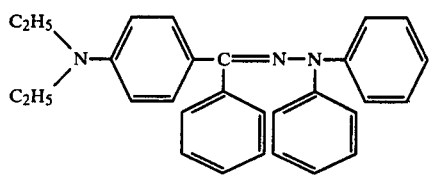
(11)
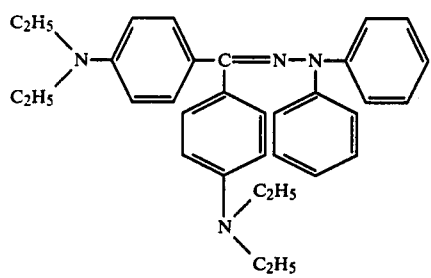
(12)
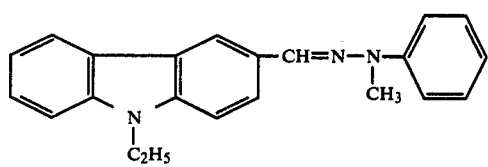
(13)
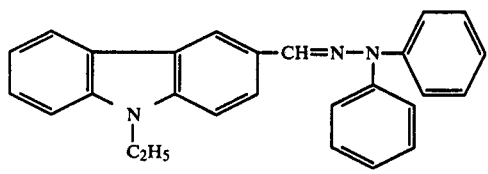
(14)
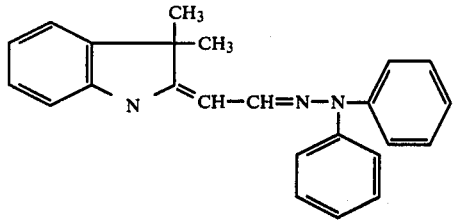
(15)

-continued
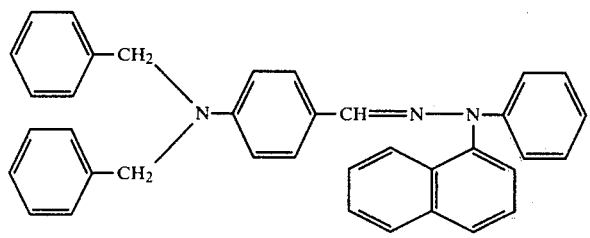 (16)
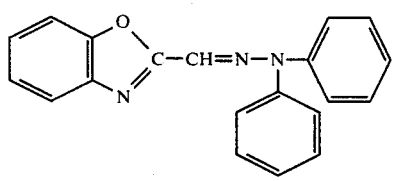 (17)
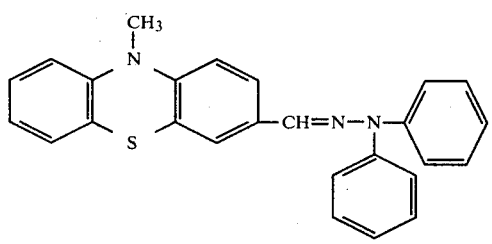 (18)
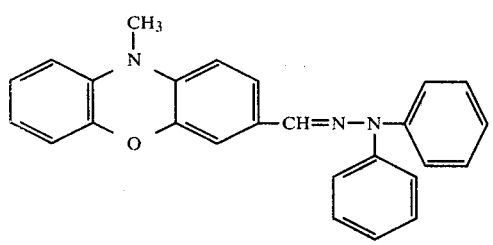 (19)
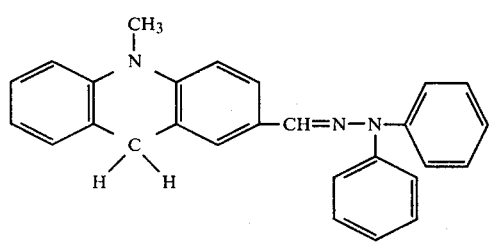 (20)
Pyrazolines
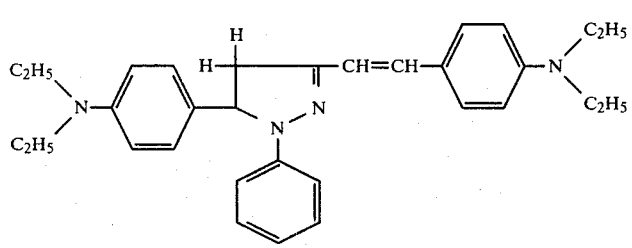 (1)

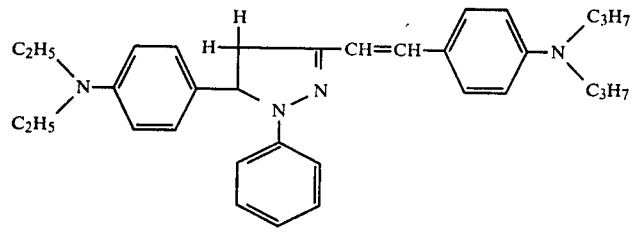
(2)
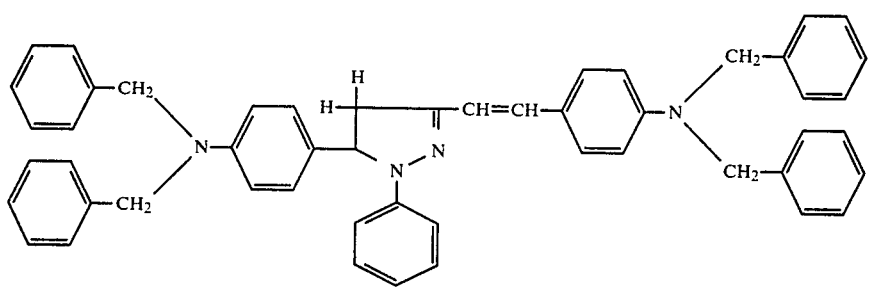
(3)
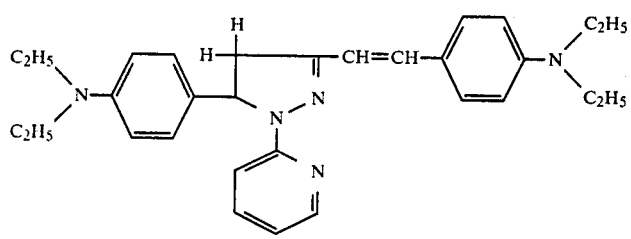
(4)
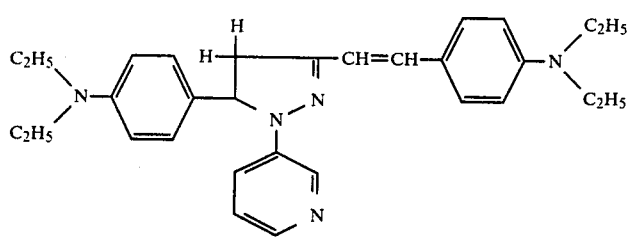
(5)
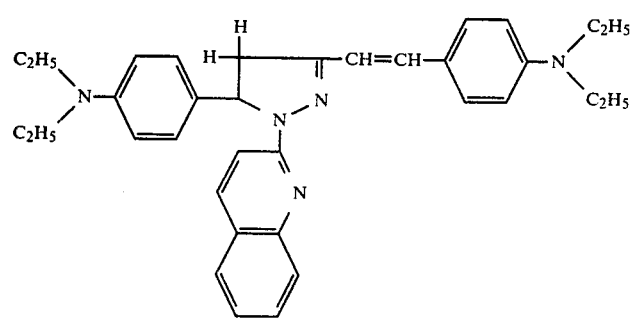
(6)
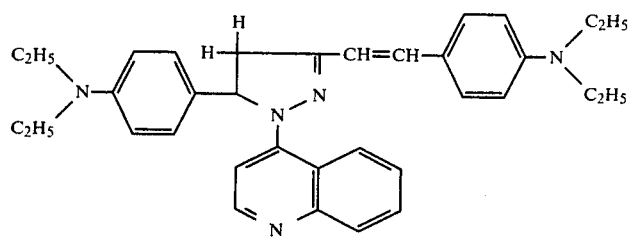
(7)

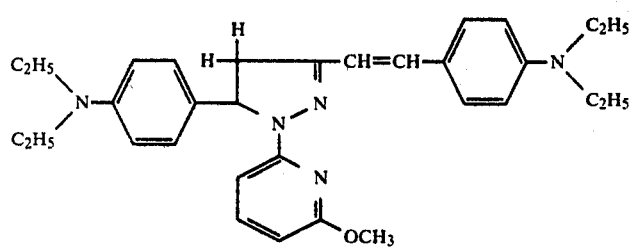
(8)
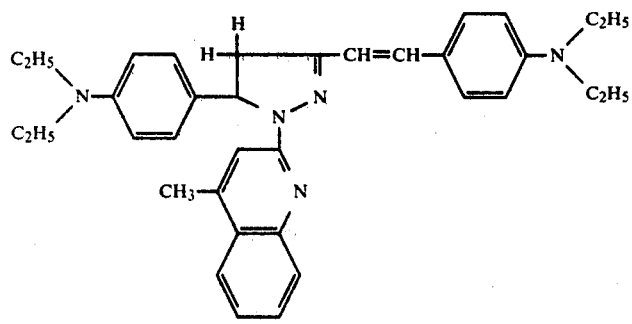
(9)
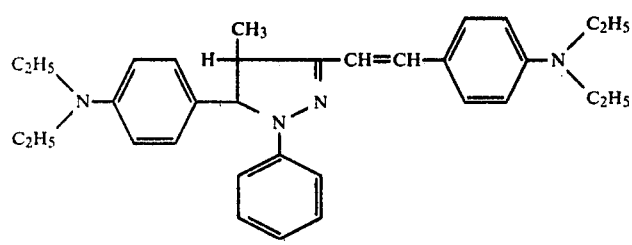
(10)
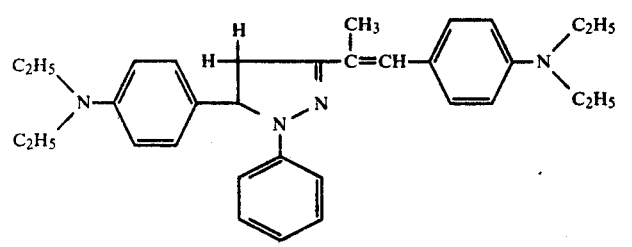
(11)
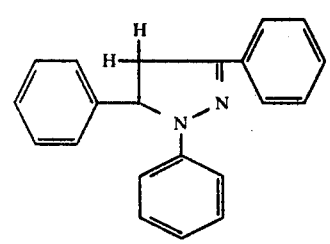
(12)
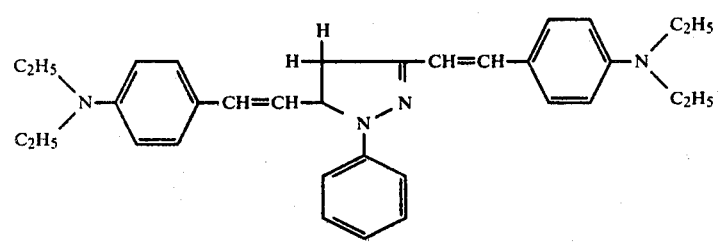
(13)
Polyarylalkanes -continued
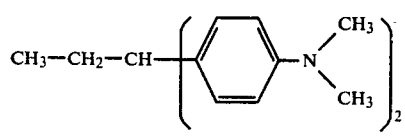 (1)
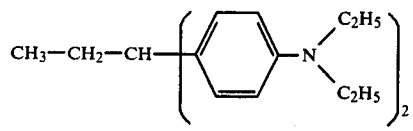 (2)
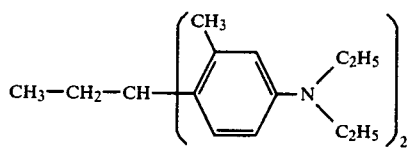 (3)
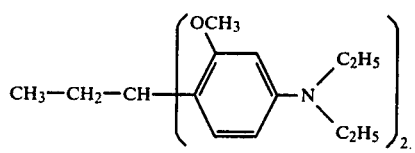 (4)
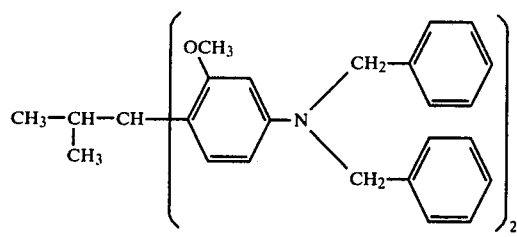 (5)
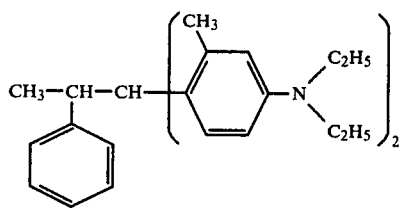 (6)
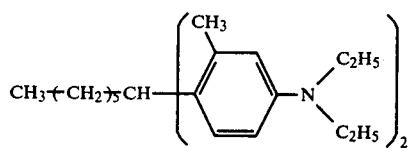 (7)
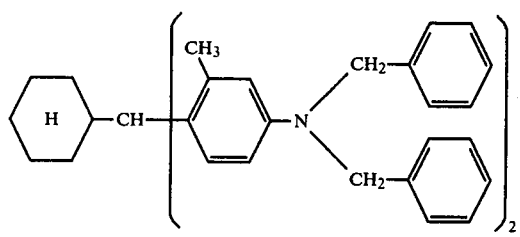 (8)
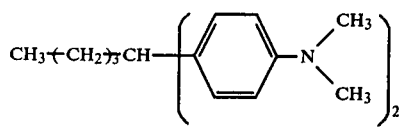 (9)

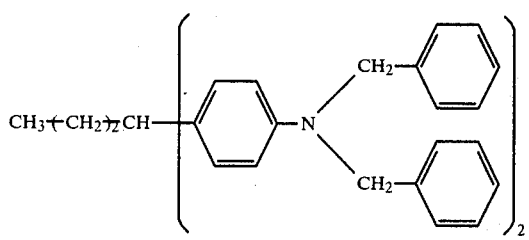
(10)
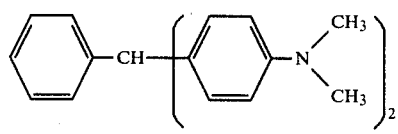
(11)
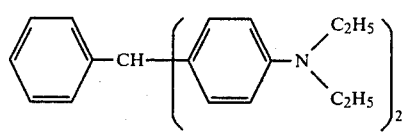
(12)
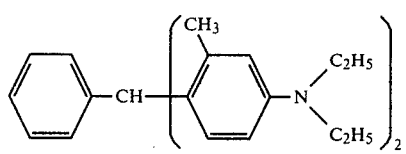
(13)
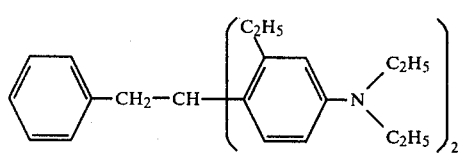
(14)
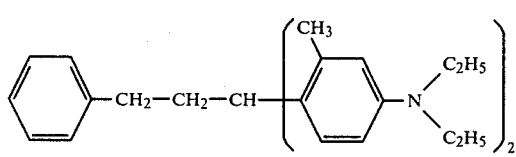
(15)
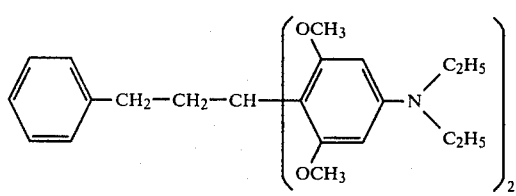
(16)
Oxadiazoles
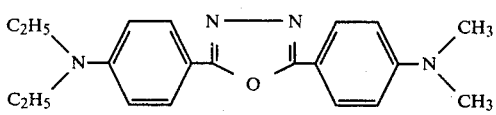
(1)
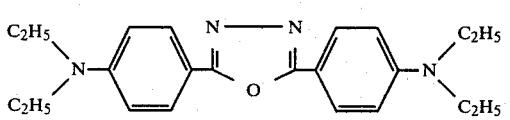
(2)

-continued
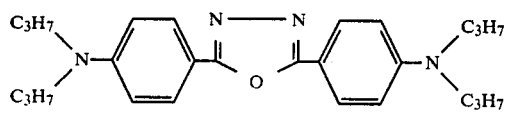 (3)
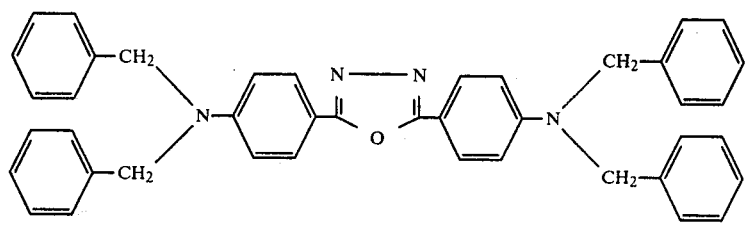 (4)
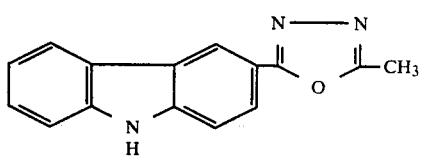 (5)
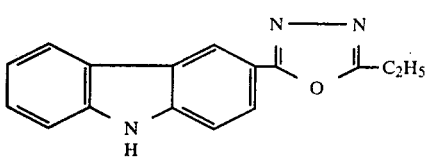 (6)
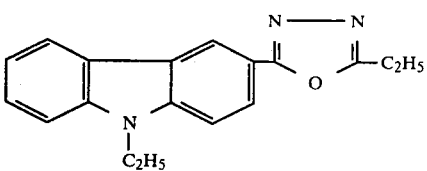 (7)
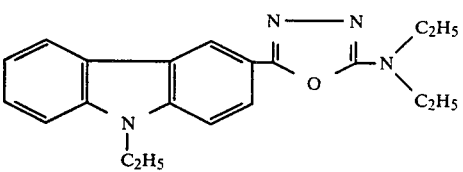 (8)
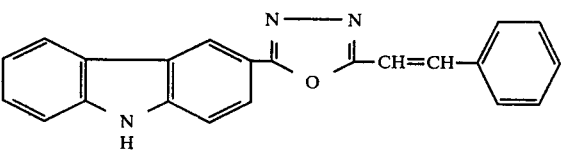 (9)
Anthracene derivatives
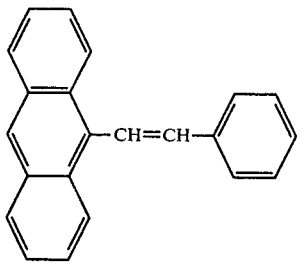 (1)

-continued
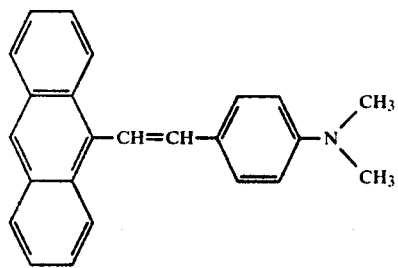
(2)
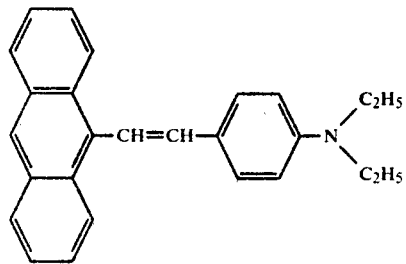
(3)
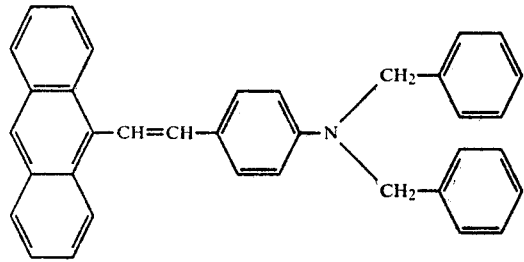
(4)
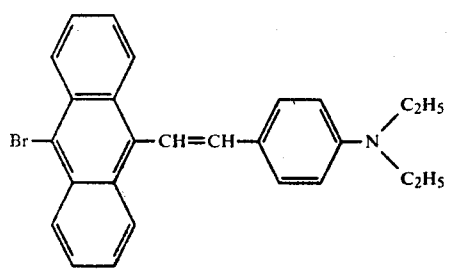
(5)
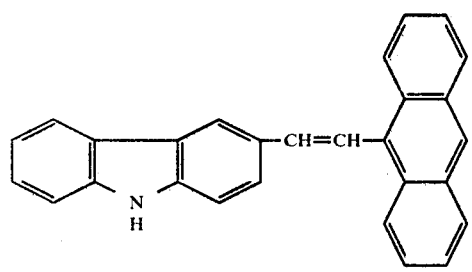
(6)
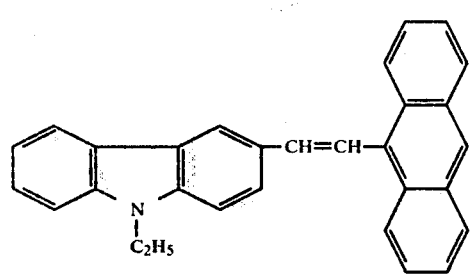
(7)

Oxazoles
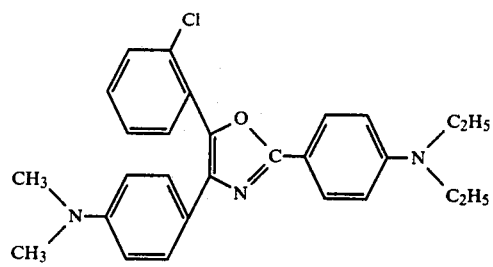
(1)
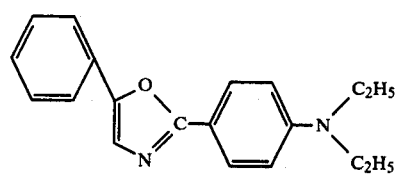
(2)
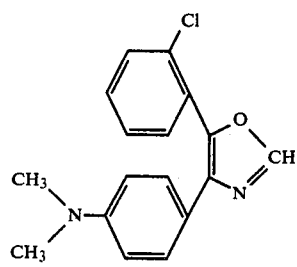
(3)
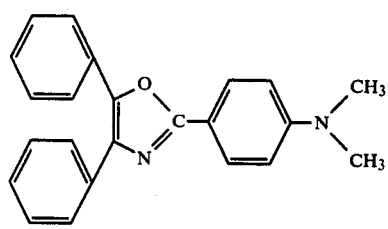
(4)
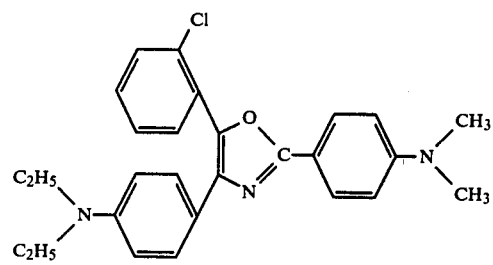
(5)
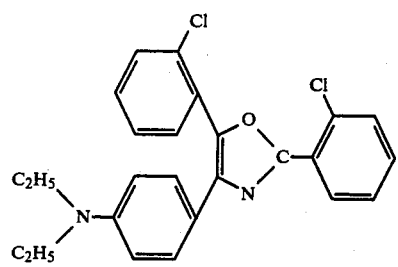
(6)

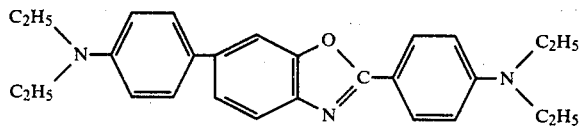
(7)

Thiazoles

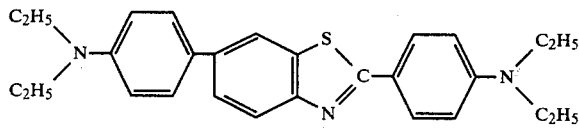
(1)

Other hole-transporting materials usable are pyrene, N-ethylcarbazole, triphenylamine, and photoconductive polymers such as, for example, poly(N-vinylcarbazole), halogenated poly(N-vinylcarbazole), polyvinylpyrene, polyvinylanthracene, polyvinylacridine, poly-9-vinylphenylanthracene, pyrene-formaldehyde resin, and ethylcarbazole-formaldehyde resin. The charge-transporting materials, in this invention, are not limited to those cited above and can be used singly or in combination of two or more.

In the electrophotographic photosensitive member of this invention, for the purpose of uniforming the injection of carrier from the charge generation layer into the upper charge transport layer, the surface of charge generation layer may be polished or mirror-finished, if necessary.

The substrate used in the electrophotographic photosensitive member of this invention may be of any type so far as it is conductive; any type of conventional conductive substrate may be applied. As examples thereof may be cited sheets of metals such as aluminum, vanadium, molybdenum, chromium, cadmium, titanium, nickel, copper, zinc, palladium, indium, tin, platinum, gold, stainless steel, and brass; and plastic sheets vacuum metallized or laminated with these metals. As to the shape of substrate, various forms of substrate may be used including sheet, cylinder, and other forms.

When using a photosensitive member which comprises a conductive layer, charge generation layer, and charge transport layer laminated in this order and has an electron-transporting substance as the charge-transporting material, it is necessary to charge the surface of charge transport layer positively; on exposing the charged surface to a pattern of light, electrons produced in the charge generation layer of exposed areas are injected into the charge transport layer, then arrive at the surface, and neutralize positive charges to decay the surface potential, thereby producing an electrostatic contrast between exposed and non-exposed areas; the electrostatic latent image thus formed is developed with a negatively charged toner, giving a visible image. This toner image may be directly fixed or transferred onto paper or plastic film, developed, and fixed.

It is also possible to transfer said electrostatic latent image onto an insulating layer of transfer paper and develop and fix the transferred electrostatic image. Any known type of developing agent, development process, or fixing process may be applied in this invention; there is no particular limitation in these matters.

On the other hand, when the charge-transporting material is made of a hole-transporting substance, the surface of charge transport layer is required to be negatively charged; on exposing the charged surface to a pattern of light, holes produced in the charge generation layer of exposed areas are injected into the charge transport layer, then arrive at the surface, and neutralize negative charges to decay the surface potential, thereby producing an electrostatic contrast between exposed and non-exposed areas. Contrary to the case where an electron-transporting substance is used, it is necessary for the development to use a positively charged toner.

The electrophotographic photosensitive member of this invention can be prepared also by dispersing the disazo pigment, represented by the formula (I), with a binder similar to the above-mentioned one applicable in the formation of charge transport layer, and coating this dispersion on a conductive substrate, followed by drying. Another way of preparing the present electrophotographic photosensitive member is that said disazo pigment of formula (I) and a charge-transfer complex, formed from said electron-transporting and hole-transporting materials, are dispersed in a suitable binder, and this dispersion is coated on a conductive substrate and dried.

In any type of photosensitive member, it is possible to incorporate at least one of the azo pigments of this invention and jointly use a pigment different in light absorption behavior, if necessary, thereby enhancing the sensitivity of photosensitive member; to use two or more of said azo pigments in combination, thereby providing a panchromatic photosensitive member; or to use said azo pigment in combination with a charge-generating material selected from known dyes and pigments.

Electrophotographic photosensitive members of this invention can be utilized not only for electrophotographic copying machines, but also over a wide range of electrophotographic applications such as those to laser printers, CRT printers, etc.

The present invention will be illustrated with reference to the following examples:

EXAMPLES 1–83

A bond layer of 0.80 g/m$^2$ was formed on each aluminum plate of 100μ thickness by coating an aqueous solution of poly(vinylalcohol) thereon, followed by drying.

Each of the pigments shown in Table 1 (5 g), a polyester resin (20% solids, registered trademark: Polyester Adhesive 49,000, mfd. by Du Pont de Nemours & Co.) (10 g), and tetrahydrofuran (80 ml), after dispersed, were coated on said bond layer to form a charge generation layer of 0.20 g/m$^2$ in dry weight.

A hydrazone compound (5 g) represented by the formula

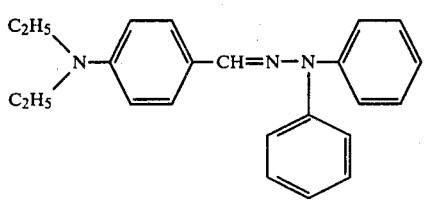

and poly(methylmethacrylate) resin (5 g) (number average mol. wt. about 100,000) were dissolved in tetrahydrofuran (70 ml), and coated on said charge generation layer to form a charge transport layer of 10 g/m² in dry weight.

Each electrophotographic photosensitive member prepared in this way was corona-charged at ⊖5 KV in the electrostatic process by using an electrostatic copying paper testing machine (Model SP-428, mfd. by Kawaguchi Denki K.K.), retained for 10 seconds in a dark place, and then exposed to light at an intensity of 5 lux, to examine charge bearing characteristics.

The results are shown in Table 1, wherein Vo is original potential (V), Rv is potential retention (%) after 10-second standing in a dark place, and E ½ is exposure quantity (lux.sec) for halving the original potential.

TABLE 1

| Example No. | Pigment No. | Vo (⊖ V) | Rv (%) | E½ (lux · sec) |
|---|---|---|---|---|
| 1 | 1 | 510 | 91 | 4.8 |
| 2 | 2 | 485 | 89 | 7.6 |
| 3 | 3 | 505 | 90 | 6.5 |
| 4 | 4 | 510 | 89 | 5.6 |
| 5 | 5 | 505 | 90 | 6.4 |
| 6 | 6 | 520 | 92 | 5.0 |
| 7 | 7 | 515 | 91 | 6.3 |
| 8 | 8 | 500 | 89 | 7.8 |
| 9 | 9 | 495 | 90 | 8.7 |
| 10 | 10 | 520 | 91 | 8.0 |
| 11 | 11 | 510 | 87 | 9.5 |
| 12 | 12 | 515 | 90 | 7.5 |
| 13 | 13 | 490 | 87 | 8.5 |
| 14 | 14 | 505 | 92 | 5.8 |
| 15 | 15 | 510 | 91 | 6.0 |
| 16 | 16 | 520 | 91 | 5.1 |
| 17 | 17 | 510 | 91 | 5.9 |
| 18 | 18 | 510 | 92 | 5.5 |
| 19 | 19 | 520 | 91 | 5.8 |
| 20 | 20 | 505 | 92 | 6.4 |
| 21 | 21 | 520 | 92 | 6.1 |
| 22 | 22 | 505 | 90 | 8.6 |
| 23 | 23 | 480 | 82 | 11.5 |
| 24 | 24 | 510 | 91 | 8.2 |
| 25 | 25 | 490 | 88 | 9.5 |
| 26 | 26 | 535 | 92 | 7.2 |
| 27 | 27 | 510 | 90 | 8.8 |
| 28 | 28 | 520 | 90 | 7.5 |
| 29 | 29 | 470 | 85 | 12.5 |
| 30 | 30 | 525 | 91 | 9.4 |
| 31 | 31 | 515 | 89 | 7.5 |
| 32 | 32 | 530 | 91 | 8.5 |
| 33 | 33 | 520 | 90 | 9.0 |
| 34 | 34 | 525 | 89 | 10.5 |
| 35 | 35 | 535 | 92 | 13.5 |
| 36 | 36 | 510 | 91 | 11.6 |
| 37 | 37 | 540 | 93 | 14.2 |
| 38 | 38 | 560 | 92 | 12.6 |
| 39 | 39 | 550 | 90 | 10.4 |
| 40 | 40 | 540 | 91 | 13.1 |
| 41 | 41 | 550 | 92 | 7.8 |
| 42 | 42 | 560 | 90 | 10.7 |
| 43 | 43 | 540 | 90 | 6.3 |
| 44 | 44 | 550 | 91 | 7.4 |
| 45 | 45 | 530 | 91 | 7.0 |
| 46 | 46 | 540 | 94 | 5.8 |
| 47 | 47 | 525 | 93 | 7.2 |

TABLE 1-continued

| Example No. | Pigment No. | Vo (⊖ V) | Rv (%) | E½ (lux · sec) |
|---|---|---|---|---|
| 48 | 48 | 490 | 84 | 8.5 |
| 49 | 49 | 535 | 91 | 7.0 |
| 50 | 50 | 480 | 83 | 9.0 |
| 51 | 51 | 500 | 92 | 10.5 |
| 52 | 52 | 515 | 92 | 6.5 |
| 53 | 53 | 520 | 90 | 7.4 |
| 54 | 54 | 535 | 94 | 6.2 |
| 55 | 55 | 510 | 92 | 8.8 |
| 56 | 56 | 520 | 90 | 11.5 |
| 57 | 57 | 515 | 91 | 7.5 |
| 58 | 58 | 490 | 88 | 12.5 |
| 59 | 59 | 505 | 87 | 9.5 |
| 60 | 60 | 485 | 82 | 8.6 |
| 61 | 61 | 520 | 90 | 9.4 |
| 62 | 62 | 535 | 91 | 8.8 |
| 63 | 63 | 505 | 89 | 10.5 |
| 64 | 46 | 510 | 88 | 11.5 |
| 65 | 65 | 520 | 89 | 8.4 |
| 66 | 66 | 470 | 88 | 11.7 |
| 67 | 67 | 460 | 90 | 11.3 |
| 68 | 68 | 480 | 90 | 10.5 |
| 69 | 69 | 490 | 93 | 8.6 |
| 70 | 70 | 460 | 90 | 6.4 |
| 71 | 71 | 500 | 91 | 5.9 |
| 72 | 72 | 480 | 89 | 6.4 |
| 73 | 73 | 480 | 91 | 6.2 |
| 74 | 74 | 470 | 90 | 9.3 |
| 75 | 75 | 480 | 91 | 11.4 |
| 76 | 76 | 460 | 88 | 11.9 |
| 77 | 77 | 490 | 84 | 8.8 |
| 78 | 78 | 500 | 85 | 6.0 |
| 79 | 79 | 500 | 86 | 6.5 |
| 80 | 80 | 530 | 90 | 5.1 |
| 81 | 81 | 500 | 88 | 7.9 |
| 82 | 82 | 510 | 89 | 6.4 |
| 83 | 83 | 520 | 91 | 7.0 |

EXAMPLES 84–86

A solution of 5 g of 2,4,7-trinitrofluorenone and 5 g of a polycarbonate of bisphenol A (viscosity average mol.wt. about 30,000) in 70 ml of tetrahydrofuran was coated on each of the three charge generation layers prepared in Examples 1, 21, and 46 to give a dry coating weight of 12 g/m². The charge bearing characteristic values of these photosensitive members, measured in the same manner as Examples 1–83, but by positive charging, are shown in Table 2.

TABLE 2

| Example No. | Pigment No. | Vo (⊕ V) | Rv (%) | E½ (lux · sec) |
|---|---|---|---|---|
| 84 | 1 | 495 | 87 | 14.2 |
| 85 | 21 | 530 | 91 | 20.5 |
| 86 | 46 | 525 | 89 | 18.5 |

EXAMPLE 87

A dispersion of 5 g of pigment No. 6, used in Example 6, in a solution of 2 g of a poly(vinylbutyral) resin (degree of butyral conversion 63 mole%) in 95 ml of ethanol was coated on a vacuum-deposited aluminum surface on a Mylar film to form a charge generation layer of 0.2 g/m² in dry weight.

Then, a solution of 5 g 2,5-bis(p-diethylaminophenyl)-1,3,4-oxadiazole and 5 g of a phenoxy resin (registered trademark: Bakelite PKHH, mfd. by Union Carbide Corp.) in 70 ml of tetrahydrofuran was coated on said charge generation layer to form a charge transport layer of 11 g/m² in dry weight.

Charge bearing characteristic values of the photosensitive member prepared were measured. The results are as follows:

Vo ⊖515 V, Rv 92%, E½ 6.5 lux.sec

EXAMPLES 89-91

Each aluminum plate of 100μ thickness was coated with an aqueous ammonia solution of casein to form a bond layer of 1.0 g/m² after drying.

Each of the disazo pigments (1.0 g) shown in Table 3 was added to a solution of 5 g of an oxazole compound represented by the formula

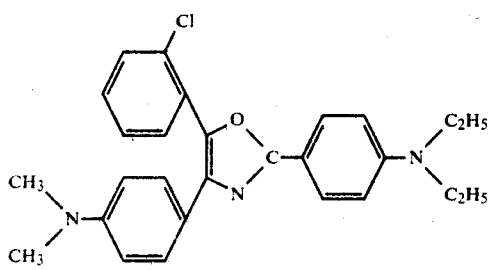

and 5 g of a poly(N-vinylcarbazole) (number average mol.wt. about 30,000) in 70 ml of tetrahydrofuran, and after dispersed, was coated on each bond layer and dried to give a coating weight of 12 g/m².

The photosensitive members thus prepared were tested for charge bearing characteristics in the same manner as Examples 1-83 but by positive charging. The results are shown in Table 3.

TABLE 3

| Example No. | Pigment No. | Vo (⊕ V) | Rv (%) | E½ (lux · sec) |
|---|---|---|---|---|
| 89 | 2 | 475 | 84 | 16.5 |
| 90 | 29 | 485 | 87 | 19.4 |
| 91 | 61 | 495 | 84 | 17.6 |

EXAMPLES 92-94

Each of the disazo pigments (1 g) shown in Table 4 was dispersed in a solution of 5 g of a pyrazoline compound represented by the formula

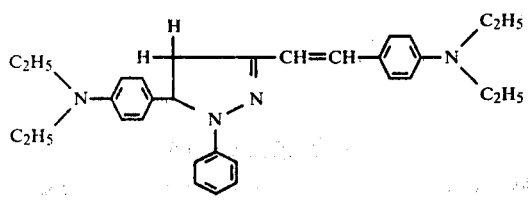

and 5 g of an isophthalic acid-terephalic acid copolyester of bisphenol A (molar ratio of isophthalic acid:terephthalic acid = 1:1) in 70 ml of tetrahydrofuran, and this dispersion was coated on the bond layer prepared in Examples 1-83, and dried to give a coating with of 12 g/m².

The photosensitive members thus prepared were tested for charge bearing characteristics in the same manner as Examples 1-83 but by positive charging. The results are shown in Table 4.

TABLE 4

| Example No. | Pigment No. | Vo (⊕ V) | Rv (%) | E½ (lux · sec) |
|---|---|---|---|---|
| 92 | 1 | 510 | 90 | 17.5 |
| 93 | 21 | 510 | 88 | 22.4 |
| 94 | 46 | 515 | 90 | 20.5 |

EXAMPLE 95

A photosensitive member was prepared in the same manner as Example 1 except for using a pyrazoline compound represented by the formula

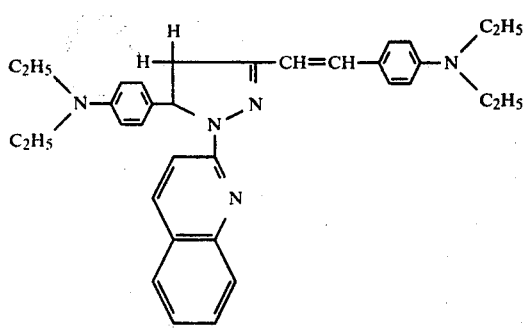

in place of the charge-transporting compound used in Example 1.

Using the same testing machine as in Example 1, charging and exposing were repeated under such constant conditions as to give an initial dark portion potential ($V_D$) of ⊖500 V and a light portion potential ($V_L$) of ⊖30 V, to examine the stabilities of $V_D$ and $V_L$ during repeated survice operations. The results are as follows:

| Number repeated operations | $V_D$ (⊖ V) | $V_L$ (⊖ V) |
|---|---|---|
| 1 | 500 | 30 |
| 5000 | 490 | 35 |
| 10000 | 475 | 43 |

As is evident from these results, the electrophotographic photosensitive member of this invention is excellent in potential stability.

EXAMPLES 96-100

A dispersion of 5 g of pigment No. 28, used in Example 28, in solution of 2 g of the above-mentioned poly(vinylbutyral) resin (see Example 87) in 95 ml of ethanol was coated on a vacuum-deposited aluminum surface on each Mylar film to form a charge generation layer of 0.2 g/m² in dry weight.

Then, a solution of 5 g each of the charge-transporting compounds shown in Table 5 and 5 g of the above-mentioned phenoxy resin (see Example 87) in 70 ml of tetrahydrofuran was coated on each charge generation layer and dried to form a charge transport layer of 11 g/m² in dry weight.

Charge bearing characteristics of the photosensitive members thus prepared were measured in the same manner as Examples 1-83. The characteristic values are shown in Table 6.

TABLE 5

| Charge-transporting compound | Example No. |
|---|---|
| 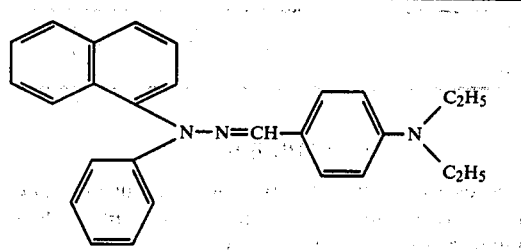 | 96 |
| 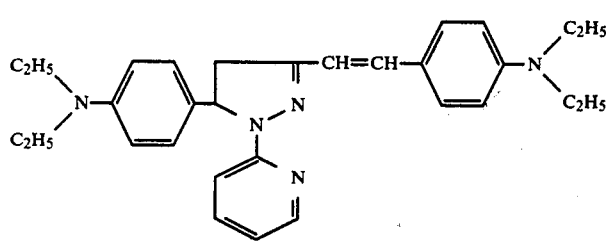 | 97 |
| 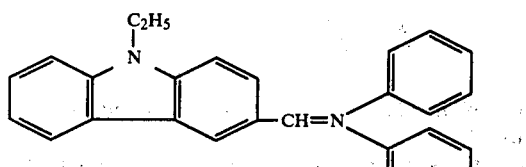 | 98 |
| 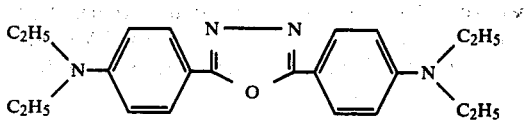 | 99 |
| 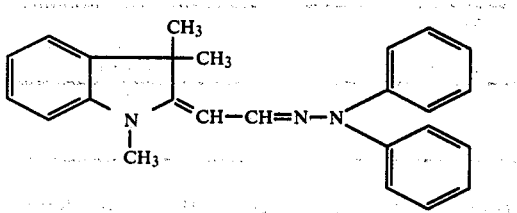 | 100 |

TABLE 6

| Example No. | Vo (⊖ V) | Rv (%) | E½ (lux · sec) |
|---|---|---|---|
| 96 | 490 | 91 | 6.7 |
| 97 | 520 | 94 | 6.9 |
| 98 | 505 | 90 | 10.5 |
| 99 | 510 | 88 | 14.8 |
| 100 | 525 | 91 | 7.8 |

EXAMPLES 101-105

A charge generation layer was prepared in the same manner as Example 96 except for using pigment No. 57 in place of the pigment used in Example 96.

Then, a solution of 5 g each of the charge-transporting compounds shown in Table 7 and 5 g of the above-mentioned phenoxy resin (see Example 87) in 70 ml of tetrahydrofuran was coated on said charge generation layer and dried to form a charge transport layer of 11 g/m² in dry weight.

Charge bearing characteristics of photosensitive members thus prepared were measured in the same manner Examples 1-83. The characteristic values are shown in Table 8.

TABLE 7

| Charge-transporting compound | Example No. |
|---|---|
| ![structure] | 101 |
| ![structure] | 102 |
| ![structure] | 103 |
| ![structure] | 104 |
| ![structure] | 105 |

TABLE 8

| Example No. | Vo (−V) | Rv (%) | E½ (lux · sec) |
|---|---|---|---|
| 101 | 500 | 89 | 6.1 |
| 102 | 535 | 93 | 7.2 |
| 103 | 510 | 90 | 8.4 |
| 104 | 520 | 91 | 13.9 |
| 105 | 510 | 88 | 8.6 |

What we claim is:

1. An organic photoconductive material represented by the formula

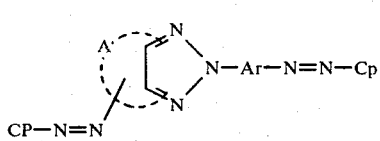

(I)

wherein A is an atomic group necessary for completing a substituted or unsubstituted aromatic hydrocarbon ring, Ar is a substituted or unsubstituted arylene group, and Cp is a coupler residue.

2. An organic photoconductive material according to claim 1, which is represented by the following formula (1):

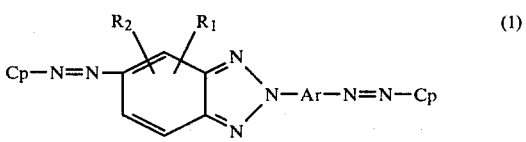

(1)

wherein Ar is a substituted or unsubstituted arylene group, Cp is a coupler residue, and $R_1$ and $R_2$ are hydrogen, halogen, or monovalent organic residue.

3. An organic photoconductive material according to claim 1, which is represented by the following formula (2):

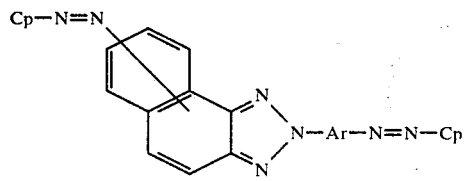 (2)

wherein Ar is a substituted or unsubstituted arylene group and Cp is a coupler residue.

4. An organic photoconductive material according to claim 1, wherein said coupler residue is a residue derived from a coupler selected from the group consisting of hydroxynaphthoic acid amide type couplers, hydroxynaphthalic acid imide type couplers, and aminonaphthol type couplers.

5. An organic photoconductive material according to claim 4, wherein said coupler residue derived from a hydroxynaphthoic acid amide type coupler is represented by the following formula (3):

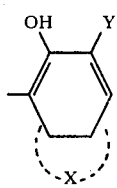 (3)

wherein X is an atomic group necessary for completing substituted or unsubstituted aromatic hydrocarbon ring, or substituted or unsubstituted heterocyclic ring; Y is

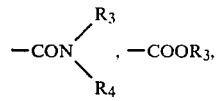

or hydrogen; $R_3$ is hydrogen, substituted or unsubstituted alkyl, substituted or unsubstituted aralkyl, or substituted or unsubstituted aryl; and $R_4$ is substituted or unsubstituted alkyl, substituted or unsubstituted aralkyl, substituted or unsubstituted aryl, substituted or unsubstituted heterocyclic residue, or substituted or unsubstituted amino.

6. An organic photoconductive material according to claim 4, wherein said coupler residue derived from a hydroxyphthalic acid imide type coupler is represented by the following formula (4) or (5);

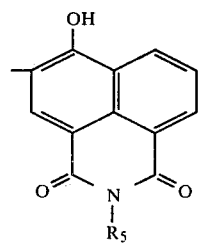 (4)

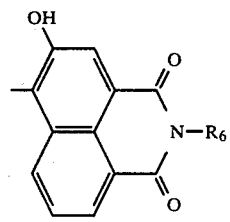 (5)

wherein $R_5$ and $R_6$ are substituted or unsubstituted alkyl, substituted or unsubstituted aralkyl, or substituted or unsubstituted aryl.

7. An organic photoconductive material according to claim 4, wherein said coupler residue derived from an aminonaphthol type coupler is represented by the following formula (6) or (7):

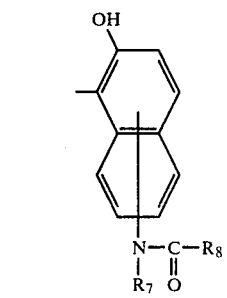 (6)

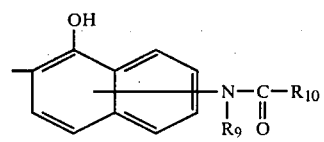 (7)

wherein $R_7$ and $R_9$ are hydrogen, substituted or unsubstituted alkyl, substituted or unsubstituted aralkyl, or substituted or unsubstituted aryl; and $R_8$ and $R_{10}$ are substituted or unsubstituted aryl.

8. An organic photoconductive material according to claim 1, wherein said Ar is substituted or unsubstituted phenylene, or substituted or unsubstituted naphthylene.

9. An electrophotographic photosensitive member characterized by having a layer which contains a disazo pigment represented by the formula

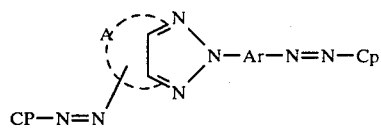

wherein A is an atomic group necessary for completing a substituted or unsubstituted aromatic hydrocarbon ring, Ar is a substituted or unsubstituted arylene group, and Cp is a coupler residue.

10. An electrophotographic photosensitive member according to claim 9, wherein said disazo pigment is represented by the following formula (1):

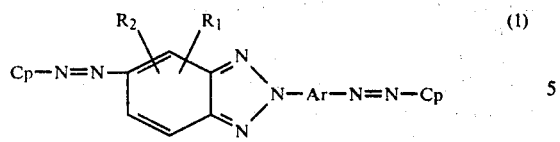

(1)

wherein Ar is a substituted or unsubstituted arylene group, Cp is a coupler residue, and $R_1$ and $R_2$ are hydrogen, halogen, or monovalent organic residue.

11. An electrophotographic photosensitive member according to claim 9, wherein said disazo pigment is represented by the following formula (2):

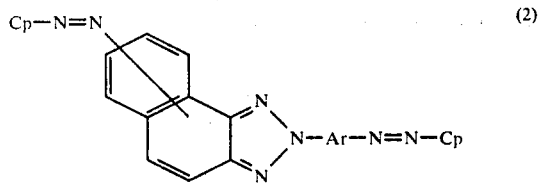

(2)

wherein Ar is a substituted or unsubstituted arylene group and Cp is a coupler residue.

12. An electrophotographic photosensitive member according to claim 11, wherein said coupler residue is a residue derived from a coupler selected from the group consisting of hydroxynaphthoic acid amide type couplers, hydroxynaphthalic acid imide type couplers, and aminonaphthol type couplers.

13. An electrophotographic photosensitive member according to claim 12, wherein said coupler residue derived from a hydroxynaphthoic acid amide type coupler is represented by the following formula (3):

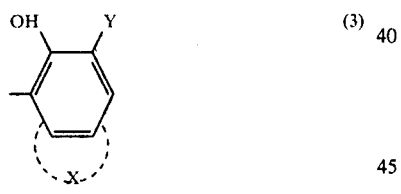

(3)

wherein X is an atomic group necessary for completing substituted or unsubstituted aromatic hydrocarbon ring, or substituted or unsubstituted heterocyclic ring; Y is

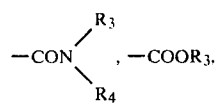

or hydrogen; $R_3$ is hydrogen, substituted or unsubstituted alkyl, substituted or unsubstituted aralkyl, or substituted or unsubstituted aryl; and $R_4$ is substituted or unsubstituted alkyl, substituted or unsubstituted aralkyl, substituted or unsubstituted aryl, substituted or unsubstituted heterocyclic residue, or substituted or unsubstituted amino.

14. A electrophotographic photosensitive member according to claim 12, said coupler residue derived from a hydroxynaphthalic acid imide type coupler is represented by the following formula (4) or (5):

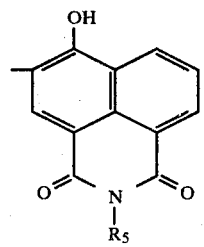

(4)

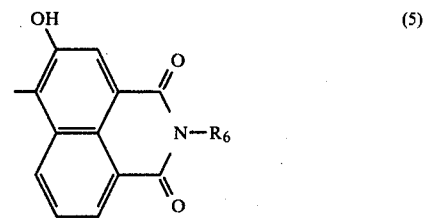

(5)

wherein $R_5$ and $R_6$ are substituted or unsubstituted alkyl, substituted or unsubstituted aralkyl, or substituted or unsubstituted aryl.

15. An electrophotographic photosensitive member according to claim 12, wherein said coupler residue derived from an aminonaphthol type coupler is represented by the following formula (6) or (7):

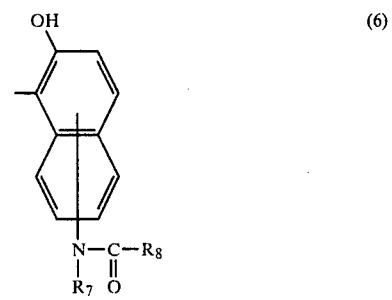

(6)

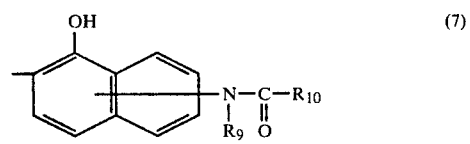

(7)

wherein $R_7$ and $R_9$ are hydrogen, substituted or unsubstituted alkyl, substituted or unsubstituted aralkyl, or substituted or unsubstituted aryl; and $R_8$ and $R_{10}$ are substituted or unsubstituted aryl.

16. An electrophotographic photosensitive member according to claim 9, wherein said Ar is substituted or unsubstituted phenylene, or substituted or unsubstituted naphthylene.

17. An electrophotographic photosensitive member according to claim 9, wherein said photosensitive member comprises a conductive substrate, a charge generation layer containing the disazo pigment represented by formula (I), and a charge transport layer.

18. An electrophotographic photosensitive member according to claim 17, wherein said charge generation layer comprises a binder and the disazo pigment represented by formula (I).

19. An electrophotographic photosensitive member according to claim 17, wherein said charge transport layer is coated on the charge generation layer.

20. An electrophotographic photosensitive member according to claim 18, wherein said binder is selected from the group consisting of polyvinyl butyral, polyvinyl acetate, polyesters, polycarbonates, phenoxy resins, acryl resins, polyacrylamide, polyamides, polyvinyl pyridine, cellulose resins, polyurethane resins, epoxy resins, casein and polyvinyl alcohol.

21. An electrophotographic photosensitive member according to claim 17, wherein said charge transport layer comprises a binder and at least one of charge transporting compounds.

22. An electrophotographic photosensitive member according to claim 21, wherein said charge transporting compound is selected from the group consisting of hydrazones, pyrazolines, polyaryl-alkanes, oxadiazoles, anthracenes, oxazoles, thiazoles, carbazoles, photoconductive polymers and fluorenones.

23. An electrophotographic photosensitive member according to claim 22, wherein said charge transporting compound is selected from hydrazones.

24. An electrophotographic photosensitive member according to claim 21, wherein said binder is selected from the group consisting of acryl resins, polystyrene, polyesters and polycarbonates.

25. An electrophotographic photosensitive member according to claim 9, wherein the photosensitive member comprises an electrically conductive substrate and a photosensitive layer containing the disazo pigments represented by formula (I) and at least one of charge transporting compounds.

26. An electrophotographic photosensitive member according to claim 19, wherein said photosensitive member comprises a adhesive layer between the charge generation layer and the conductive layer.

* * * * *